(12) United States Patent
Zhu et al.

(10) Patent No.: US 12,015,468 B2
(45) Date of Patent: Jun. 18, 2024

(54) TECHNIQUES FOR ADAPTIVE BEAM LEVEL SELECTION

(71) Applicant: QUALCOMM Incorporated, San Diego, CA (US)

(72) Inventors: Jun Zhu, San Diego, CA (US); Mihir Vijay Laghate, San Diego, CA (US); Raghu Narayan Challa, San Diego, CA (US); Brian Clarke Banister, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/667,387

(22) Filed: Feb. 8, 2022

(65) Prior Publication Data

US 2023/0254027 A1 Aug. 10, 2023

(51) Int. Cl.
*H04B 7/02* (2018.01)
*H04B 7/0404* (2017.01)
*H04B 7/06* (2006.01)
*H04B 17/309* (2015.01)
*H04L 5/00* (2006.01)

(52) U.S. Cl.
CPC ......... *H04B 7/0695* (2013.01); *H04B 7/0404* (2013.01); *H04B 17/309* (2015.01); *H04L 5/0048* (2013.01)

(58) Field of Classification Search
CPC .. H04B 7/0695; H04B 17/309; H04B 7/0404; H04L 5/0048

USPC ........ 375/267, 260, 261, 259, 219, 295, 316
See application file for complete search history.

(56) References Cited

U.S. PATENT DOCUMENTS

| | | | |
|---|---|---|---|
| 2019/0379427 A1 | 12/2019 | Geekie et al. | |
| 2020/0412425 A1* | 12/2020 | Laghate | H04B 7/0626 |
| 2021/0226681 A1 | 7/2021 | Raghavan et al. | |
| 2022/0166465 A1* | 5/2022 | Ali | H04B 7/0404 |
| 2022/0256389 A1* | 8/2022 | Maggi | H04B 7/063 |

OTHER PUBLICATIONS

International Search Report and Written Opinion—PCT/US2023/010605—ISA/EPO—dated Apr. 5, 2023.

* cited by examiner

*Primary Examiner* — Zewdu A Kassa
(74) *Attorney, Agent, or Firm* — Dalei Dong; Holland & Hart LLP

(57) ABSTRACT

Techniques and devices for wireless communication are described. A communication device may identify a set of beam level selection parameters. The set of beam level selection parameters may include traffic information, channel information, application information, or any combination thereof. The communication device may select, based on the identified set of beam level selection parameters, a beam level, from a set of beam levels, different from a baseline beam level associated with the wireless communication. The selected beam level may be associated with a number of antenna elements different from a number of antenna elements associated with the baseline beam level. The communication device may perform the wireless communication based on the selected beam level.

30 Claims, 12 Drawing Sheets

TECHNIQUES FOR ADAPTIVE BEAM LEVEL SELECTION

FIELD OF DISCLOSURE

The following relates to wireless communication, including techniques for adaptive beam level selection.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Some wireless communications systems may support beamforming operations for directional communications. In some cases, beamforming techniques may be deficient.

SUMMARY

The described techniques relate to improved techniques, devices, and apparatuses that support techniques for adaptive beam level selection. For example, a communication device may identify a set of beam level selection parameters. The set of beam level selection parameters may include traffic information, channel information, application information, or any combination thereof. The communication device may select, based on the identified set of beam level selection parameters, a beam level, from a set of beam levels different from a baseline beam level associated with the wireless communication. The selected beam level may be associated with a number of antenna elements different from a number of antenna elements associated with the baseline beam level. The communication device may perform the wireless communication based on the selected beam level. The present disclosure may therefore promote reduced power consumption and longer battery life, among other benefits.

A method for wireless communication at a UE is described. The method may include determining a set of beam level selection parameters, the set of beam level selection parameters including traffic information, channel information, application information, or any combination thereof, selecting a beam level of a set of beam levels associated with the wireless communication based on the determined set of beam level selection parameters, the selected beam level being associated with a number of antenna elements of the UE, and performing the wireless communication based on the selected beam level.

An apparatus for wireless communication at a UE is described. The apparatus may include a processor, memory coupled with the processor, and instructions stored in the memory. The instructions may be executable by the processor to cause the apparatus to determine a set of beam level selection parameters, the set of beam level selection parameters including traffic information, channel information, application information, or any combination thereof, select a beam level of a set of beam levels associated with the wireless communication based on the determined set of beam level selection parameters, the selected beam level being associated with a number of antenna elements of the UE, and perform the wireless communication based on the selected beam level.

Another apparatus for wireless communication at a UE is described. The apparatus may include means for determining a set of beam level selection parameters, the set of beam level selection parameters including traffic information, channel information, application information, or any combination thereof, means for selecting a beam level of a set of beam levels associated with the wireless communication based on the determined set of beam level selection parameters, the selected beam level being associated with a number of antenna elements of the UE, and means for performing the wireless communication based on the selected beam level.

A non-transitory computer-readable medium storing code for wireless communication at a UE is described. The code may include instructions executable by a processor to determine a set of beam level selection parameters, the set of beam level selection parameters including traffic information, channel information, application information, or any combination thereof, select a beam level of a set of beam levels associated with the wireless communication based on the determined set of beam level selection parameters, the selected beam level being associated with a number of antenna elements of the UE, and perform the wireless communication based on the selected beam level.

Some examples of the method, apparatuses, and non-transitory computer-readable medium described herein may further include operations, features, means, or instructions for determining a respective threshold for one or more beam level selection parameter of the determined set of beam level selection parameters, where selecting the beam level of the set of beam levels associated with the wireless communication may be further based on the determined respective threshold for the one or more beam level selection parameter of the determined set of beam level selection parameters.

In some examples of the method, apparatuses, and non-transitory computer-readable medium described herein, the selected beam level of the set of beam levels corresponds to a first number of antenna elements of the UE based on the respective threshold for the one or more beam level selection parameter of the determined set of beam level selection parameters being greater than a threshold and the selected beam level of the set of beam levels corresponds to a second number of antenna elements of the UE based on the respective threshold for the one or more beam level selection parameter of the determined set of beam level selection parameters being less than the threshold, the first number of antenna elements being greater than the second number of antenna elements.

Some examples of the method, apparatuses, and non-transitory computer-readable medium described herein may further include operations, features, means, or instructions for performing the wireless communication using an increased number of antenna elements of the UE relative to a baseline number of antenna elements at the UE based on the respective threshold for the one or more beam level selection parameter of the determined set of beam level selection parameters being greater than a threshold.

Some examples of the method, apparatuses, and non-transitory computer-readable medium described herein may further include operations, features, means, or instructions for performing the wireless communication using a decreased number of antenna elements of the UE relative to a baseline number of antenna elements at the UE based on the respective threshold for the one or more beam level selection parameter of the determined set of beam level selection parameters being less than a threshold.

In some examples of the method, apparatuses, and non-transitory computer-readable medium described herein, the respective threshold for the one or more beam level selection parameters of the determined set of beam level selection parameters may be based on a step size associated with the selected beam level of the set of beam levels.

Some examples of the method, apparatuses, and non-transitory computer-readable medium described herein may further include operations, features, means, or instructions for determining the set of beam level selection parameters during a temporal window based on a configuration.

Some examples of the method, apparatuses, and non-transitory computer-readable medium described herein may further include operations, features, means, or instructions for determining uplink data in a memory buffer associated with the UE based on the traffic information, where selecting the beam level of the set of beam levels associated with the wireless communication may be further based on the determined uplink data in the memory buffer associated with the UE.

In some examples of the method, apparatuses, and non-transitory computer-readable medium described herein, the selected beam level of the set of beam levels corresponds to a first number of antenna elements of the UE based on the determined uplink data in the memory buffer associated with the UE being greater than a threshold and the selected beam level of the set of beam levels corresponds to a second number of antenna elements of the UE based on the determined uplink data in the memory buffer associated with the UE being less than the threshold, the first number of antenna elements being greater than the second number of antenna elements.

Some examples of the method, apparatuses, and non-transitory computer-readable medium described herein may further include operations, features, means, or instructions for determining a channel metric associated with the UE based on the channel information, the channel metric corresponding to an uplink channel or a downlink channel, or both, where selecting the beam level of the set of beam levels associated with the wireless communication may be further based on the determined channel metric associated with the UE.

In some examples of the method, apparatuses, and non-transitory computer-readable medium described herein, the determined channel metric includes virtual power headroom (VPHR) information, signal-to-noise-ratio (SNR) information, spectral efficiency (SPEFF) information, throughput, or any combination thereof.

In some examples of the method, apparatuses, and non-transitory computer-readable medium described herein, the selected beam level of the set of beam levels corresponds to a first number of antenna elements of the UE based on the channel metric associated with the UE being greater than a threshold and the selected beam level of the set of beam levels corresponds to a second number of antenna elements of the UE based on the channel metric associated with the UE being less than the threshold, the first number of antenna elements being greater than the second number of antenna elements.

Some examples of the method, apparatuses, and non-transitory computer-readable medium described herein may further include operations, features, means, or instructions for determining a set of uplink channel metrics associated with the UE based on the channel information, the determined set of uplink channel metrics including VPHR information, SNR information, SPEFF information, throughput, or any combination thereof and determining a respective priority of each uplink channel metric of the determined set of uplink channel metrics, where selecting the beam level of the set of beam levels associated with the wireless communication may be further based on the determined respective priority of each uplink channel metric of the determined set of uplink channel metrics.

Some examples of the method, apparatuses, and non-transitory computer-readable medium described herein may further include operations, features, means, or instructions for ranking each uplink channel metric of the determined set of uplink channel metrics in accordance with the respective priority of each uplink channel metric of the determined set of uplink channel metrics and based on each uplink channel metric of the determined set of uplink channel metrics being less than or greater than a respective threshold.

Some examples of the method, apparatuses, and non-transitory computer-readable medium described herein may further include operations, features, means, or instructions for determining a throughput for an application associated with the UE based on the application information, where selecting the beam level of the set of beam levels associated with the wireless communication may be further based on the determined throughput for the application associated with the UE.

In some examples of the method, apparatuses, and non-transitory computer-readable medium described herein, the selected beam level of the set of beam levels corresponds to a first number of antenna elements of the UE based on the determined throughput for the application associated with the UE being greater than a threshold and the selected beam level of the set of beam levels corresponds to a second number of antenna elements of the UE based on the determined throughput for the application associated with the UE being less than the threshold, the first number of antenna elements being less than the second number of antenna elements.

In some examples of the method, apparatuses, and non-transitory computer-readable medium described herein, the determined throughput for the application associated with the UE corresponds to an estimated throughput for the application associated with the UE.

Some examples of the method, apparatuses, and non-transitory computer-readable medium described herein may further include operations, features, means, or instructions for determining a bin rate for an application associated with the UE based on the application information, where selecting the beam level of the set of beam levels associated with the wireless communication may be further based on the determined bin rate for the application associated with the UE.

In some examples of the method, apparatuses, and non-transitory computer-readable medium described herein, the selected beam level of the set of beam levels corresponds to a first number of antenna elements of the UE based on the determined bin rate for the application associated with the UE being greater than a threshold and the selected beam level of the set of beam levels corresponds to a second number of antenna elements of the UE based on the determined bin rate for the application associated with the UE being less than the threshold, the first number of antenna elements being greater than the second number of antenna elements.

Some examples of the method, apparatuses, and non-transitory computer-readable medium described herein may further include operations, features, means, or instructions for determining an initial beam level from the set of beam levels associated with the wireless communication based on a beam sweep operation associated with a set of reference signals and a set of quality metrics associated with the set of reference signals, where selecting the beam level of the set of beam levels associated with the wireless communication may be further based on the determined initial beam level.

In some examples of the method, apparatuses, and non-transitory computer-readable medium described herein, the initial beam level may be different than the selected beam level.

Some examples of the method, apparatuses, and non-transitory computer-readable medium described herein may further include operations, features, means, or instructions for receiving the set of reference signals based on the beam sweep operation and determining one or more quality metrics of the set of quality metrics for each beam level of the set of beam levels based on the received set of reference signals, where determining the initial beam level from the set of beam levels associated with the wireless communication may be further based on the determined one or more quality metrics for each beam level of the set of beam levels.

In some examples of the method, apparatuses, and non-transitory computer-readable medium described herein, the set of reference signals includes synchronization signal blocks (SSBs), channel state information reference signals (CSI-RSs), demodulation reference signals (DMRSs), or any combination thereof.

In some examples of the method, apparatuses, and non-transitory computer-readable medium described herein, the set of quality metrics includes a reference signal received power (RSRP), an SNR, an SPEFF, a throughput, or any combination thereof.

DETAILED DESCRIPTION

Figure 1:
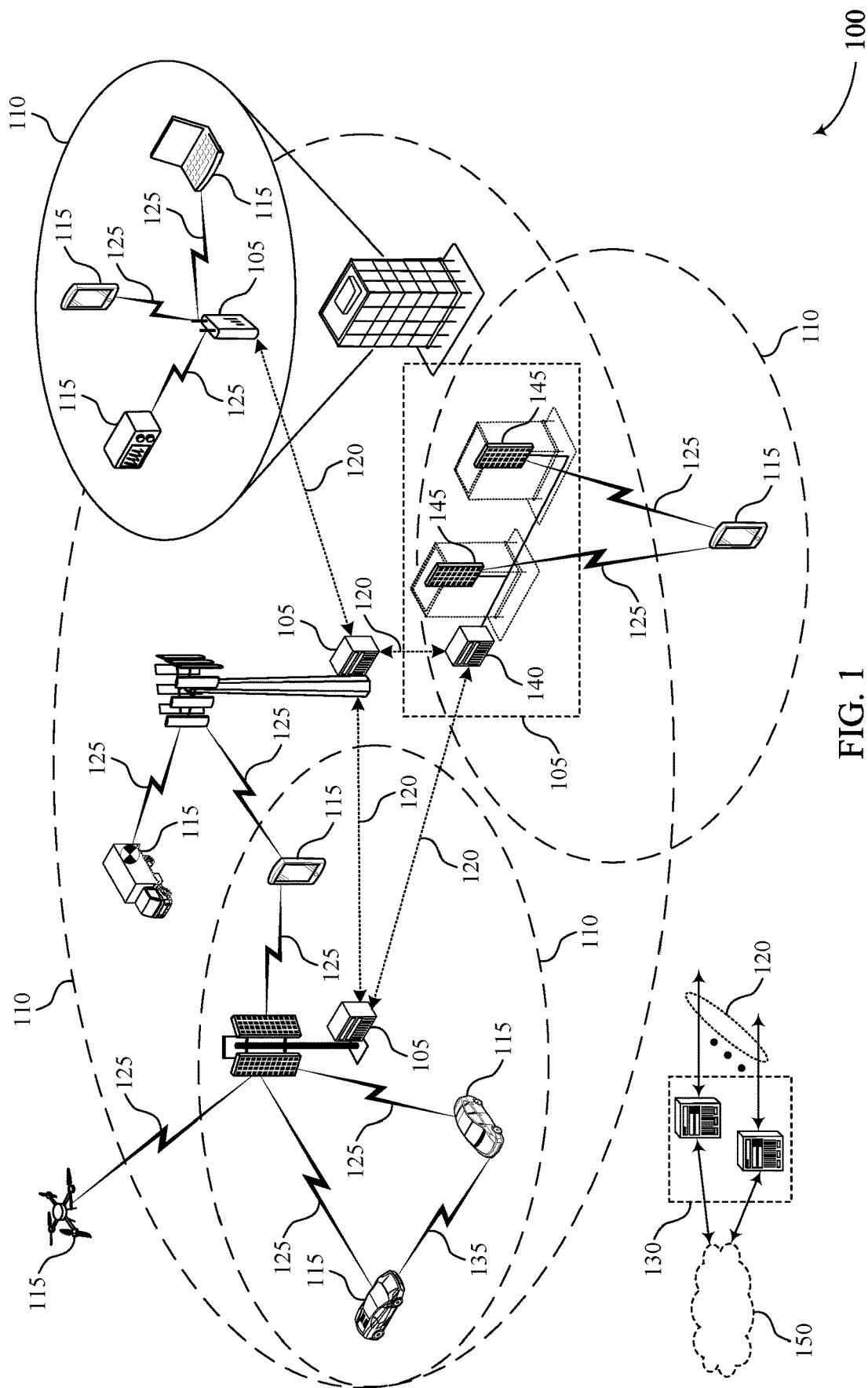
FIGS. 1 and 2 illustrate examples of wireless communications systems that support techniques for adaptive beam level selection in accordance with various aspects of the present disclosure.

In some wireless communications system, such as a millimeter wave (mmW) system or a NR system, communication devices may communicate via directional transmissions (e.g., beams), in which beamforming may be applied using one or more antenna elements to form a beam in a direction. For example, a communication device may support beamforming to reduce propagation loss of signals. In some examples, a communication device (e.g., a user equipment (UE) or a base station) may adjust a width (e.g., granularity) of a beam to improve the reception of signals at another communication device (e.g., another UE or another base station). For example, the communication device may adjust the granularity of the beam by increasing the number of antenna elements used at the communication device to generate the beam. That is, the communication device may increase the number of antenna elements at the communication device actively used for wireless communications (e.g., the number of active antenna elements). However, as the number of active antenna elements at the communication device increases, the power consumption and thermal cost at the communication device may also increase. Moreover, adjusting (e.g., refining) the granularity of a beam (e.g., by increasing the number of active antenna elements) may not improve the performance of wireless communications between the communication devices. In such cases, power consumption and thermal cost may be increased at the communication device unnecessarily.

Various aspects of the present disclosure relate to techniques for adaptive beam level selection. For example, a communication device (e.g., a UE) may refine the granularity of a beam based on information collected at the communication device. In some examples, the communication device may refine the granularity of the beam by selecting a beam level (e.g., associated with a number of antenna elements) based on traffic conditions (e.g., uplink traffic conditions, downlink traffic conditions, or both), the quality of the wireless channel used for communications, or the throughput of an application supported by the communication device. In some examples, the communication device may perform a beam sweep operation to determine a baseline (e.g., initial, current, default, previously used) beam level associated with a baseline (e.g., initial, current, default, previously used) number of antenna elements. The communication device may determine a set of parameters associated with traffic conditions, channel quality, or application throughput.

The communication device may use the set of parameters to determine whether to increase or decrease the beam level, for example relative to the baseline beam level. In some examples, by increasing or decreasing the beam level, the communication device may increase or decrease the number of antenna elements being used for the wireless communications (e.g., may refine the granularity of the beam). In some examples, the communication device may determine to increase the beam level (e.g., the number of antenna elements relative to the baseline number of antenna elements) if one or more of the parameters satisfies a respective threshold. Additionally or alternatively, the communication device may determine to decrease the beam level (e.g., the number of antenna elements relative to the baseline number of antenna elements) if one or more of the parameters fails to satisfy the respective threshold. As a result, the communication device may avoid unnecessary power consumption and reduce thermal costs associated with beamforming.

Aspects of the disclosure are initially described in the context of wireless communications systems. Aspects of the disclosure are further illustrated by and described with reference to apparatus diagrams, system diagrams, and flowcharts that relate to techniques for adaptive beam level selection.

FIG. 1 illustrates an example of a wireless communications system 100 that supports techniques for adaptive beam level selection in accordance with various aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or a NR network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a network entity, a network node, a node, a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may include of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 MHz to 300 gigahertz (GHz). For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support mmW communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), unlicensed radio frequency spectrum band radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at some orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with some orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples of the wireless communications system 100, a communication device (e.g., a UE 115 or a base station 105) may identify a set of beam level selection parameters. The set of beam level selection parameters may include traffic information, channel information, application information, or any combination thereof. The communication device (e.g., a UE 115 or a base station 105) may select, based on the identified set of beam level selection parameters, a beam level, from a set of beam levels different from a baseline beam level associated with the wireless communication. The selected beam level may be associated with a number of antenna elements different from a number of antenna elements associated with the baseline beam level. The communication device (e.g., a UE 115 or a base station 105) may perform the wireless communication based on the selected beam level. As such, the communication device (e.g., a UE 115 or a base station 105) may reduce power consumption and thermal costs, thereby increasing battery life, among other benefits.

Figure 2:
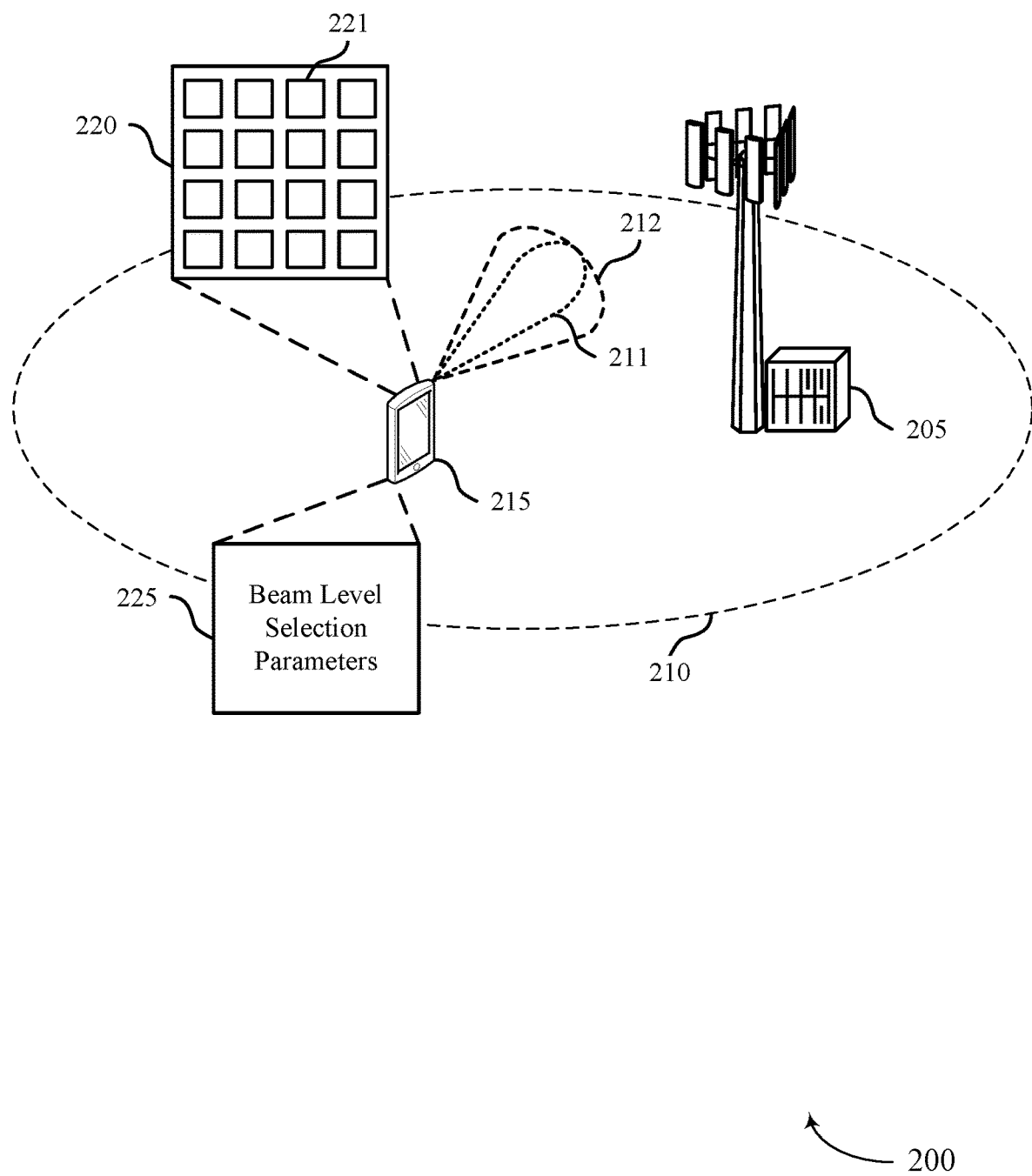

FIG. 2 illustrates an example of a wireless communications system 200 that supports techniques for adaptive beam level selection in accordance with various aspects of the present disclosure. The wireless communications system 200 may implement or be implemented by one or more aspects of the wireless communications system 100. For example, the wireless communications system 200 may include a UE 215 and a base station 205, which may be examples of the corresponding devices described with reference to FIG. 1. The UE 215 and the base station 205 may communicate within a geographic coverage area 210, which may be an example of a geographic coverage area 110 described with reference to FIG. 1.

In the example of FIG. 2, the UE 215 may support beamforming to reduce propagation loss of signals transmitted between the UE 215 and the base station 205. For example, some wireless communications channels, such as mmW channels, may suffer from relatively high propagation loss. In some examples, such propagation loss may be countered (e.g., reduced) by the use of beamforming (e.g., at both the UE 215 and the base station 205). As such, the UE 215 may select one or more beams (e.g., with a relatively narrow width) to improve the reception of signals. For example, to improve the reception of uplink signals at the base station 205, the UE 215 may use a relatively narrow (e.g., fine) transmit beam for uplink transmissions. Additionally or alternatively, the UE 215 may select (e.g., determine to use) a relatively narrow receive beam to improve reception of downlink signals (e.g., transmitted from the base station 205) at the UE 215.

In some examples, the UE 215 may determine to use (e.g., generate) a relatively narrow beam (e.g., a beam 211) by increasing the number of active antenna elements at the UE 215. For example, the UE 215 may include an antenna panel 220 with a number of antenna elements 221. The UE 215 may generate a relatively narrow beam (e.g., the beam 211) by increasing the number of antenna elements 221 used for wireless communications and a relatively wide beam (e.g., a beam 212) by decreasing the number of antenna elements 221 used for the wireless communications. That is, the number of active antenna elements used to generate the beam 211 may be increased compared to the number of antenna elements used to generate the beam 212.

In some examples, a width of a beam (e.g., the number of active antenna elements) may depend on a beam level. For example, a beam of level (n) may correspond to a number (e.g., $2^{(n-1)}$) of elements, in which each element may be connected to an antenna element (e.g., an individual antenna element). The UE 215 may change (e.g., refine, adjust) the width (e.g., granularity) of a beam by adjusting the beam level of the corresponding beam. In some examples, the performance (e.g., throughput) of the UE 215 may depend on the selection (e.g., adjustment) of a beam level. That is, throughput (e.g., uplink throughput) may depend on (e.g., be proportional to) the beam level (e.g., the number of active elements) used by the UE 215 for communications. As such, by increasing the number of active antenna elements (e.g., by adjusting the beam level) the UE 215 may improve the throughput of wireless communications between the UE 215 and the base station 205.

However, increasing the number of active antenna elements at the UE 215 may increase the power consumption and thermal cost at the UE 215. For example, power consumption and thermal costs at the UE 215 may depend on (e.g., be proportional to) the beam level (e.g., the number of active elements used for the communications). As such, the power consumption (e.g., and thermal cost) at the UE 215 may be determined by the beam level (e.g., the number of active antenna elements). That is, a beam level selected by the UE 215 for transmitting or receiving signals (e.g., transmitting uplink signals or receiving downlink signals) may impact the throughput of the corresponding communications (e.g., uplink communications or downlink communications) and the thermal cost at the UE 215. Further, adjusting the granularity of a beam (e.g., by adjusting the beam level) may not improve the performance of wireless communications between the UE 215 and the base station 205. For example, the UE 215 may determine to use the beam 212 based on the downlink performance measured at the UE 215, however the UE 215 may not consider uplink performance or other factors associated with the wireless communications at the UE 215. As such, the performance of the UE 215 may not be improved by using the beam 211 (e.g., a relatively narrow beam).

In some examples, however, the UE 215 may adaptively select a beam level (e.g., associated with a number of antenna elements 221) based on (e.g., by considering) one or more factors (e.g., parameters) associated with the performance of the UE 215. For example, the UE 215 may adaptively select a beam level based on uplink traffic of the UE 215, channel quality of wireless communications between the UE 215 and the base station 205, and throughput (e.g., of an application at the UE 215). In some examples, the UE 215 may reduce power consumption and improve performance by selecting a beam level (e.g., a number of elements) such that the throughput (e.g., uplink throughput) supported by the UE 215 (e.g., for a duration of time) may be comparable to (e.g., equal to or greater than) a threshold throughput (e.g., a throughput achieved with a maximum number of antenna elements or an otherwise acceptable number of antenna elements). That is, techniques for adaptively selecting an uplink beam level (e.g., or a downlink beam level) may enable the UE 215 to save (e.g., store) a relatively large amount (e.g., a maximum amount or an otherwise acceptable amount) of power and improve thermal behavior, while achieving comparable or improved performance relative to techniques of wireless communication in which the UE 215 uses a relatively large number (e.g., a maximum number of an otherwise acceptable number) of antenna elements for wireless communications (e.g., over a relatively long duration of time).

In some examples, the UE 215 may determine (e.g., adaptively select) a beam level based on a set of beam level selection parameters 225 identified by the UE 215. For example, the UE 215 may identify a set of beam level selection parameters 225 associated with uplink traffic of the UE 215, channel quality of wireless communications between the UE 215 and the base station 205, throughput of an application at the UE 215, or any combination thereof. The UE 215 may select, based on the identified set of beam level selection parameters 225, a beam level (e.g., from a set of beam levels) associated with a number of the antenna elements 221. The number of the antenna elements 221 associated with the selected beam level may be different from a number of the antenna elements 221 associated with a baseline beam level (e.g., an initial or previous beam level used for communications with the base station 205). The UE 215 may perform wireless communication with the base station 205 based on the selected beam level. As such, the UE 215 may reduce power consumption and thermal costs, thereby increasing battery life at the UE 215, among other benefits.

Figure 3A:
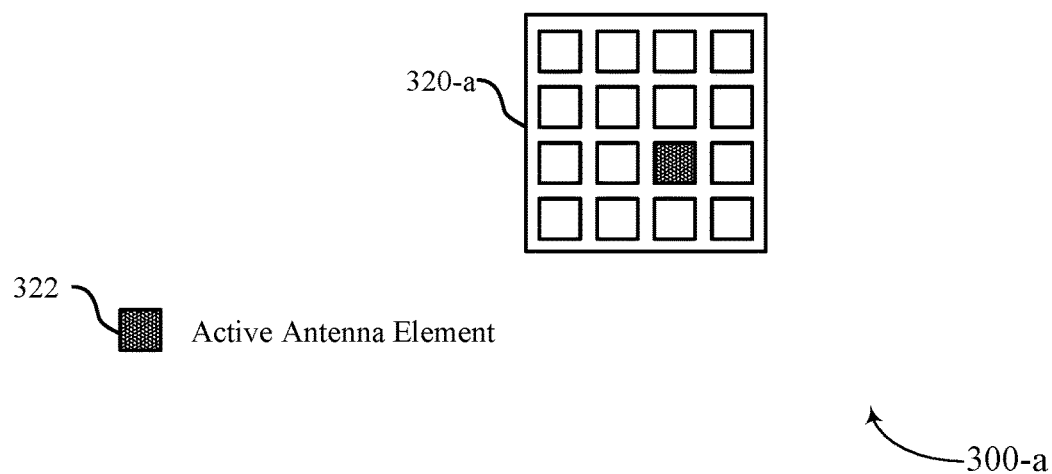
FIGS. 3A, 3B, and 3C illustrate examples of beam levels that support techniques for adaptive beam level selection in accordance with various aspects of the present disclosure.
Figure 3B:
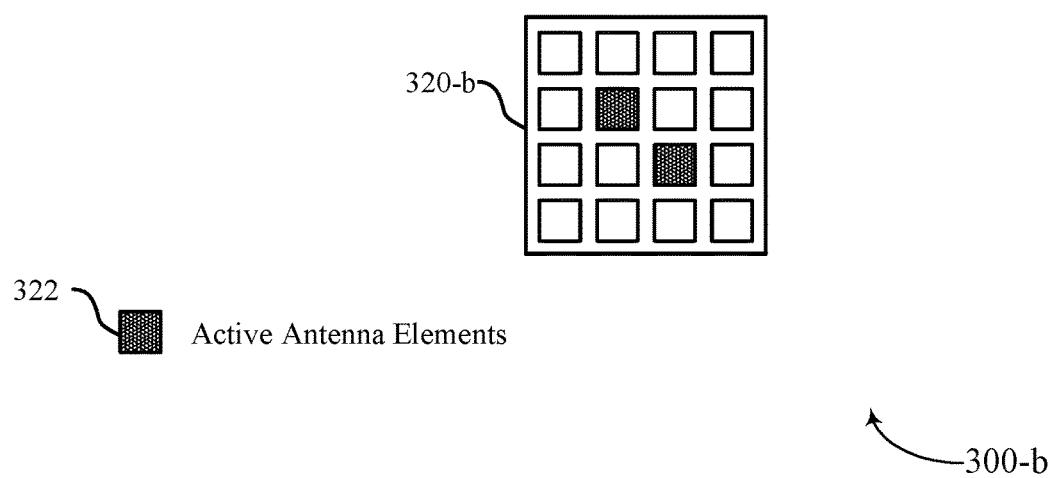
Figure 3C:
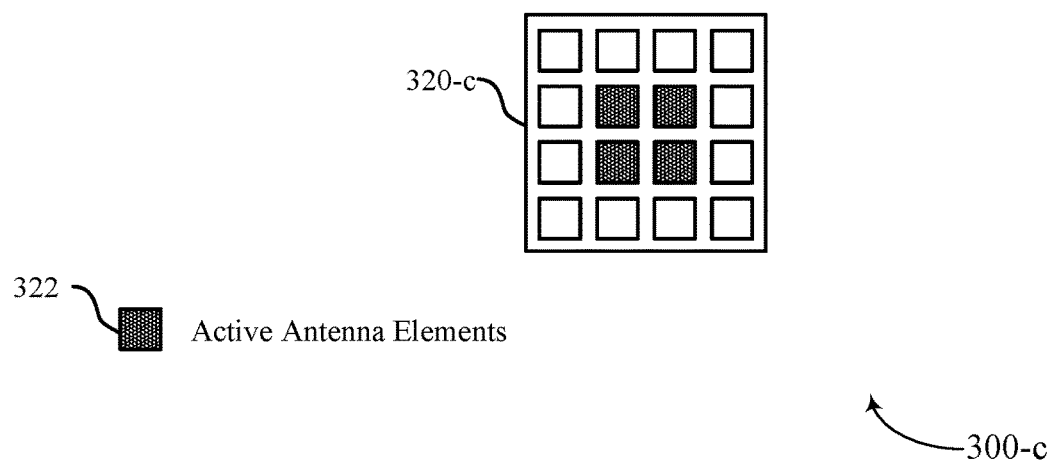

FIGS. 3A, 3B, and 3C illustrate examples of beam levels 300 (e.g., a beam level 300-a, a beam level 300-b, and a beam level 300-c, respectively) that support techniques for adaptive beam level selection in accordance with various aspects of the present disclosure. The beam levels 300 (e.g., a beam level 300-a, a beam level 300-b, and a beam level 300-c, respectively) may be implemented at or may be implemented by one or more aspects of the wireless communications system 100 and the wireless communications system 200. For example, the beam levels 300 may be implemented at or may be implemented by a UE 115 or a base station 105, which may be examples of the corresponding devices described with reference to FIGS. 1 and 2.

In some examples, a communications device (e.g., the UE 115) may adaptively select a beam level for wireless communications with another communication device (e.g., the base station 105). A beam of level (n) may correspond to a number (e.g., $2^{(n-1)}$) of antenna elements. For example, as illustrated in the example of FIG. 3A, the beam level 300-a may correspond to a beam level (n=1), in which an antenna panel 320-a may include an active antenna element 322. In the example of FIG. 3B, the beam level 300-b may correspond to a beam level (n=2), in which an antenna panel 320-b may include two active antenna elements 322. In the example of FIG. 3C, the beam level 300-c may correspond to a beam level (n=3), in an antenna panel 320-c may include four active antenna elements 322. It is to be understood that the beam levels described herein may change based on implementation of one or more devices (e.g., the UE 115, the base station 105, or both), and the examples described herein should not be considered limiting to the scope covered by the claims or the present disclosure.

In some examples, the UE 115 may adaptively select a beam level (e.g., the beam level 300-a, the beam level 300-b, or a beam level 300-c) based on a set of one or more beam level selection parameters identified by the UE 115. For example, uplink traffic information (e.g., a quantity of data to be sent by the UE 115) may be identified at (e.g., available at) the UE 115, whereas downlink traffic information may not be available at the UE 115. As such, the beam level selection parameters may include (e.g., and the beam level selected by the UE 115 may depend on) an amount of served traffic in the uplink direction (e.g., at the UE 115), uplink channel quality (e.g., one or more uplink channel quality information determined at the UE 115), or applications at (e.g., running on) the UE 115. In some examples, uplink channel quality information (e.g., determined at the UE 115) may include virtual power headroom (VPHR), an estimated signal-to-noise ratio (SNR), and estimated spectral power efficiency (SPEFF), throughput (e.g., uplink throughput), and information associated with applications running at the UE 115. In some instances, the uplink channel quality information (e.g., one or more uplink channel quality metrics, such as SNR and SPEFF) may depend on network functionality at the base station 105.

In some examples, the UE 115 may determine that increasing the beam level (e.g., the number of active antenna elements 322) may not improve the channel quality (e.g., may not improve one or more metrics associated with VPHR, SNR, SPEFF, or throughput). In such examples, the UE 115 may determine that the channel conditions are suitable and may refrain from adjusting the beam level (e.g., may determine to use a baseline beam level). Additionally or alternatively, the UE 115 may determine (e.g., consider) a beam level adjustment based on a change in the throughput of an application (e.g., a bin rate of the application), the throughput of the application (e.g., a real time throughput) satisfying a threshold (e.g., being greater than, equal to, or less than a throughput that supports the application), or both. In some examples, a relatively low throughput (e.g., a throughout of about 1-10 megabits per second (Mbps)) may support web browsing or voice over internet protocol (VoIP), a relatively average throughput (e.g., a throughout of about 10-100 Mbps) may support 4,000 pixel (4K) video streaming, and a relatively high throughput (e.g., a throughput of about 100 Mbps or greater than about 100 Mbps) may support speed test or relatively large file downloads. In some examples, by adaptively selecting a beam level (e.g., associated with a number of active antenna elements 322) based on one or more beam level selection parameters, the UE 115 may reduce power consumption and thermal costs, among other benefits.

Figure 4:
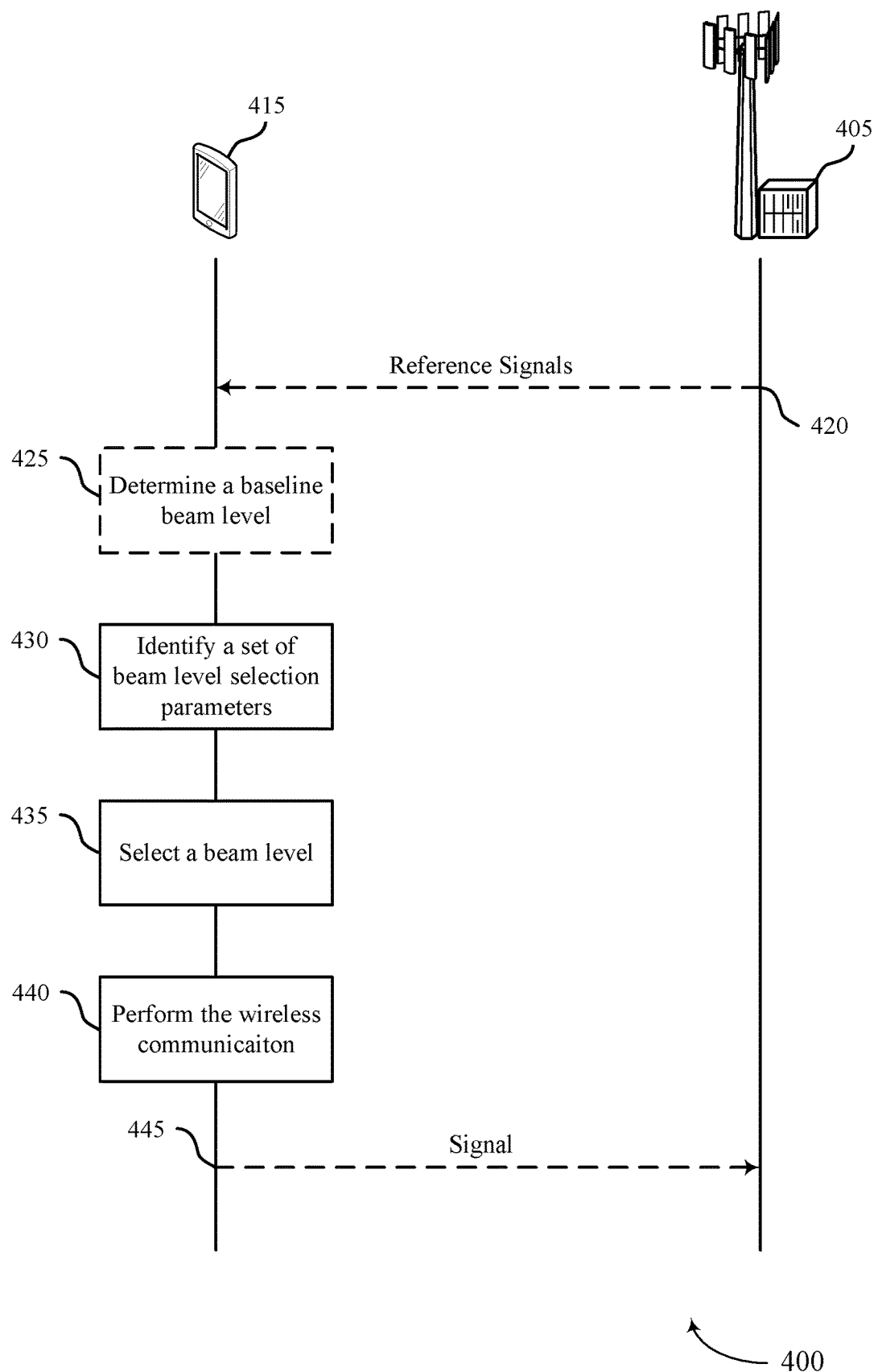
FIG. 4 illustrates an example of a process flow that supports techniques for adaptive beam level selection in accordance with various aspects of the present disclosure.

FIG. 4 illustrates an example of a process flow 400 that supports techniques for adaptive beam level selection in accordance with various aspects of the present disclosure. The process flow 400 may implement or be implemented by one or more aspects of the wireless communications system 100 and the wireless communications system 200. For example, the process flow 400 may include a UE 415 and a base station 405, which may be examples of the corresponding devices as described with reference to FIGS. 1 and 2. The process flow 400 may be implemented by the UE 415, the base station 405, or both. In the following description of the process flow 400, operations between the UE 415 and the base station 405 may occur in a different order or at different times than as shown. Some operations may also be omitted from the process flow 400, and other operations may be added to the process flow 400.

At 420, the UE 415 may, in some examples, receive one or more reference signals from the base station 405. For example, the UE 415 may perform beam sweeping (e.g., a beam sweep operation) on reference signals (e.g., synchronization signal blocks (SSBs), CSI-RSs, or physical downlink shared channel (PDSCH) demodulation reference signals (DMRSs)) to estimate one or more channel quality metrics (e.g., reference signal received power (RSRP), SNR, SPEFF, or throughput) for each beam level of a set of beam levels. The beam levels may be examples of beam levels described with reference to FIGS. 3A, 3B, and 3C. In some examples, at 425, the UE 415 may determine a baseline (e.g., initial) beam level based on the beam sweep operation (e.g., the one or more channel quality metrics determined from the beam sweep operation). For example, the UE 415 may initialize communications (e.g., with the base station 405) using a baseline number of antenna elements (e.g., a maximum number of elements or an otherwise suitable number of antenna elements) associated with the baseline beam level (e.g., a highest beam level or an otherwise acceptable beam level determined from a codebook at the UE 415).

At 430, the UE 415 may identify a set of beam level selection parameters. The beam level selection parameters may be examples of beam level selection parameters described with reference to FIGS. 3A, 3B, and 3C. For example, the set of beam level selection parameters may include traffic information (e.g., uplink traffic information), channel information, application information, or any combination thereof. At 435, the UE 415 may select a beam level (e.g., from the set of beam levels) based on the identified set of beam level selection parameters. In some examples, the selected beam level may be associated with a number of antenna elements different from the number of antenna elements associated with the baseline beam level. For example, the UE 415 may select a beam level with an increased number of antenna elements or a decreased level of antenna elements compared to the number of antenna elements associated with the baseline beam level.

In some examples, the UE 415 may adjust the beam level if one or more of the beam level selection parameters satisfy a threshold. That is, the UE 415 may select an increased beam level associated with an increased number of antenna elements (e.g., compared to the number of antenna elements associated with the baseline beam level) or a reduced beam level associated with a reduced number of antenna elements if one or more of the beam level selection parameters satisfy a threshold. For example, the UE 415 may adjust the beam level if determined uplink data in a memory buffer associated with the UE 415 satisfies a threshold (e.g., is less than, equal to, or greater than a threshold). Additionally or alternatively, the UE 415 may adjust the beam level if one or more channel quality metrics (e.g., throughput, SPEFF, SNR, or VPHR) satisfy a threshold (e.g., are less than, equal to, or greater than a threshold). In some examples, the one or more channel quality metric may change in opposing directions. For example, a first channel quality metric may increase and a second channel quality metric may decrease. In such examples, the UE 415 may determine a respective priority and a ranking (e.g., based on the respective priorities) for each of the one or more channel quality metrics. Accordingly, the UE 415 may adjust the beam level based on the change in the one or more beam quality metrics and the ranking of the one or more channel quality metrics.

Additionally or alternatively, the UE 415 may adjust the beam level if the throughput of an application switches from a reduced bin rate to an increased bin rate or an estimated (e.g., real time) throughput of the application satisfies a threshold (e.g., is less than or equal to a threshold). In some examples, multiple thresholds may be used (e.g., determined, configured, defined) for each of the one or more beam level selection parameters. In some examples, the multiple thresholds may be determined for multiple (e.g., different) step sizes (e.g., of the beam levels). In some examples, a step size of beam levels may be about 1 or may be a number greater than about 1. Additionally or alternatively, the one or more beam level selection metrics may be collected (e.g., identified, measured) within a temporal window that may cover (e.g., span) a time duration (e.g., a previous time duration).

In some examples, the UE 415 may select an increased beam level associated with an increased number of antenna elements (e.g., compared to the number of antenna elements associated with the baseline beam level) if the determined uplink data in the memory buffer associated with the UE 415 is greater than a threshold, one or more of the channel quality metrics are greater than a threshold, the bin rate of an application increases, the throughput of an application is less than a threshold, or any combination thereof. Additionally or alternatively, the UE 415 may select a reduced beam level associated with a reduced number of antenna elements (e.g., compared to the number of antenna elements associated with the baseline beam level) if the determined uplink data in the memory buffer associated with the UE 415 is less than a threshold, one or more of the channel quality metrics is less than a threshold, the bin rate of an application decreases, the throughput of an application is greater than a threshold, or any combination thereof.

At 440, the UE 415 may perform the wireless communications based on (e.g., using) the selected beam level. For example, at 445, the UE 415 may transmit one or more signals (e.g., uplink signals) to the base station 405 using a beam generated at the selected beam level (e.g., a selected beam). In some examples, the receive power (e.g., of the uplink signals transmitted from the UE 415) may depend on the width of the selected beam (e.g., and the corresponding number of antenna elements used to generate the selected beam). For example, the receive power at the base station 405 may increase as the width of the selected beam decreases (e.g., as the beam level increases). In some examples, the selected beam (e.g., and the received power at the base station 405) may depend on the multi-level coding scheme used by the UE 415 (e.g., for scheduled data), temperature (e.g., thermal triggers at the UE 415), and channel conditions (e.g., pathloss between the UE 415 and the base station 405). In some examples, by selecting a beam level based on one or more beam level selection parameters, the UE 415 may improve battery life (e.g., may save power by about 50 percent or a percentage less than or greater than 50 percent) and improve the efficiency of radio frequency hardware at the UE 415 (e.g., may optionally use the RF hardware or may operate the RF hardware with reduced capabilities).

Figure 5:
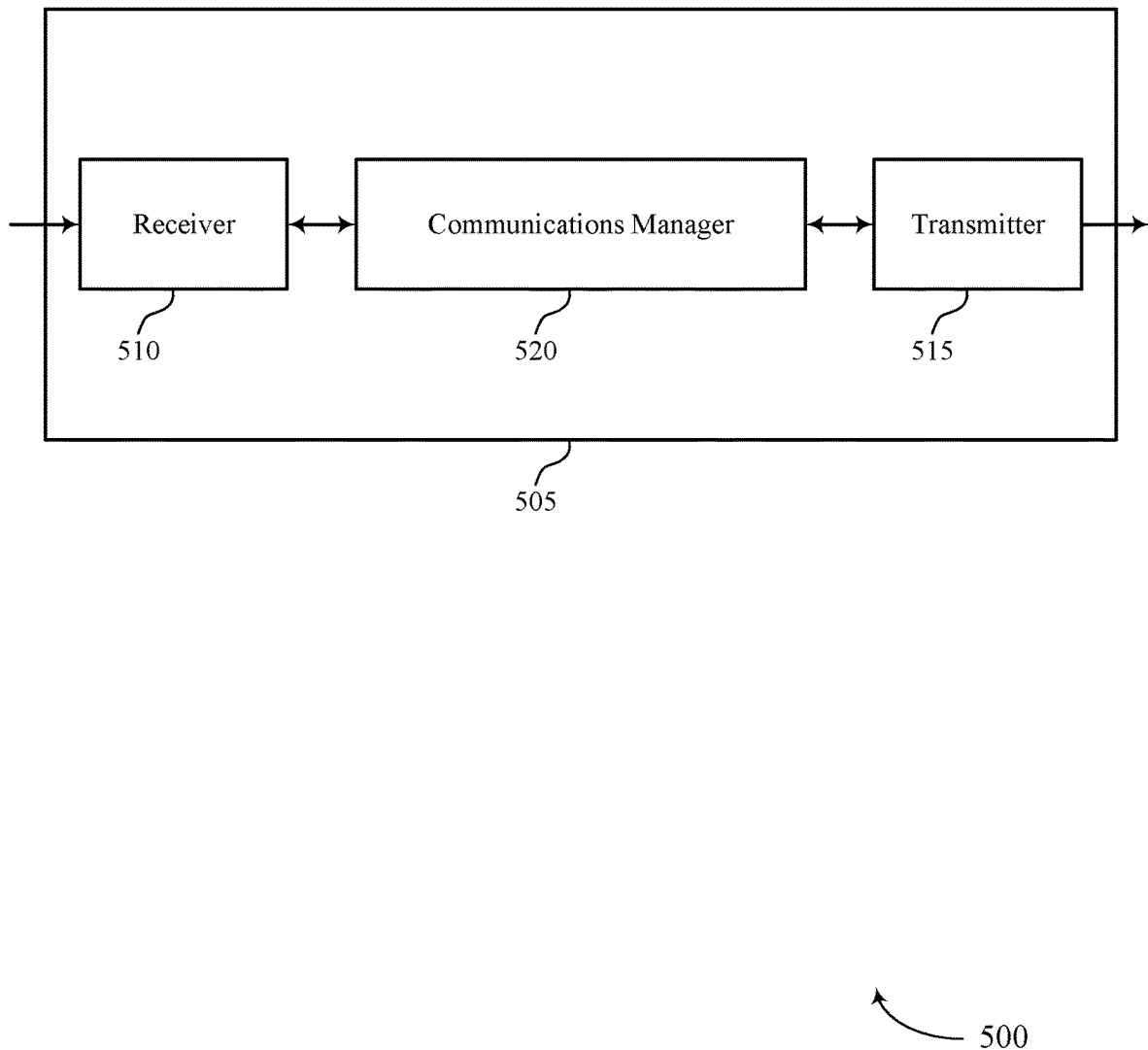
FIGS. 5 and 6 show block diagrams of devices that support techniques for adaptive beam level selection in accordance with various aspects of the present disclosure.

FIG. 5 shows a block diagram 500 of a device 505 that supports techniques for adaptive beam level selection in accordance with various aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for adaptive beam level selection). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for adaptive beam level selection). In some examples, the transmitter 515 may be co-located with a receiver 510 in a transceiver component. The transmitter 515 may utilize a single antenna or a set of multiple antennas.

The communications manager 520, the receiver 510, the transmitter 515, or various combinations thereof or various components thereof may be examples of means for performing various aspects of techniques for adaptive beam level selection as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE (e.g., the device 505) in accordance with examples as disclosed herein. For example, the communications manager 520 may be configured as or otherwise support a means for identifying a set of beam level selection parameters, the set of beam level selection parameters including traffic information, channel information, application information, or any combination thereof. The communications manager 520 may be configured as or otherwise support a means for selecting, based on the identified set of beam level selection parameters, a beam level, from a set of beam levels, different from a baseline beam level associated with the wireless communication, the selected beam level is associated with a number of antenna elements different from a number of antenna elements associated with the baseline beam level. The communications manager 520 may be configured as or otherwise support a means for performing the wireless communication based on the selected beam level.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced thermal cost and reduced power consumption.

Figure 6:
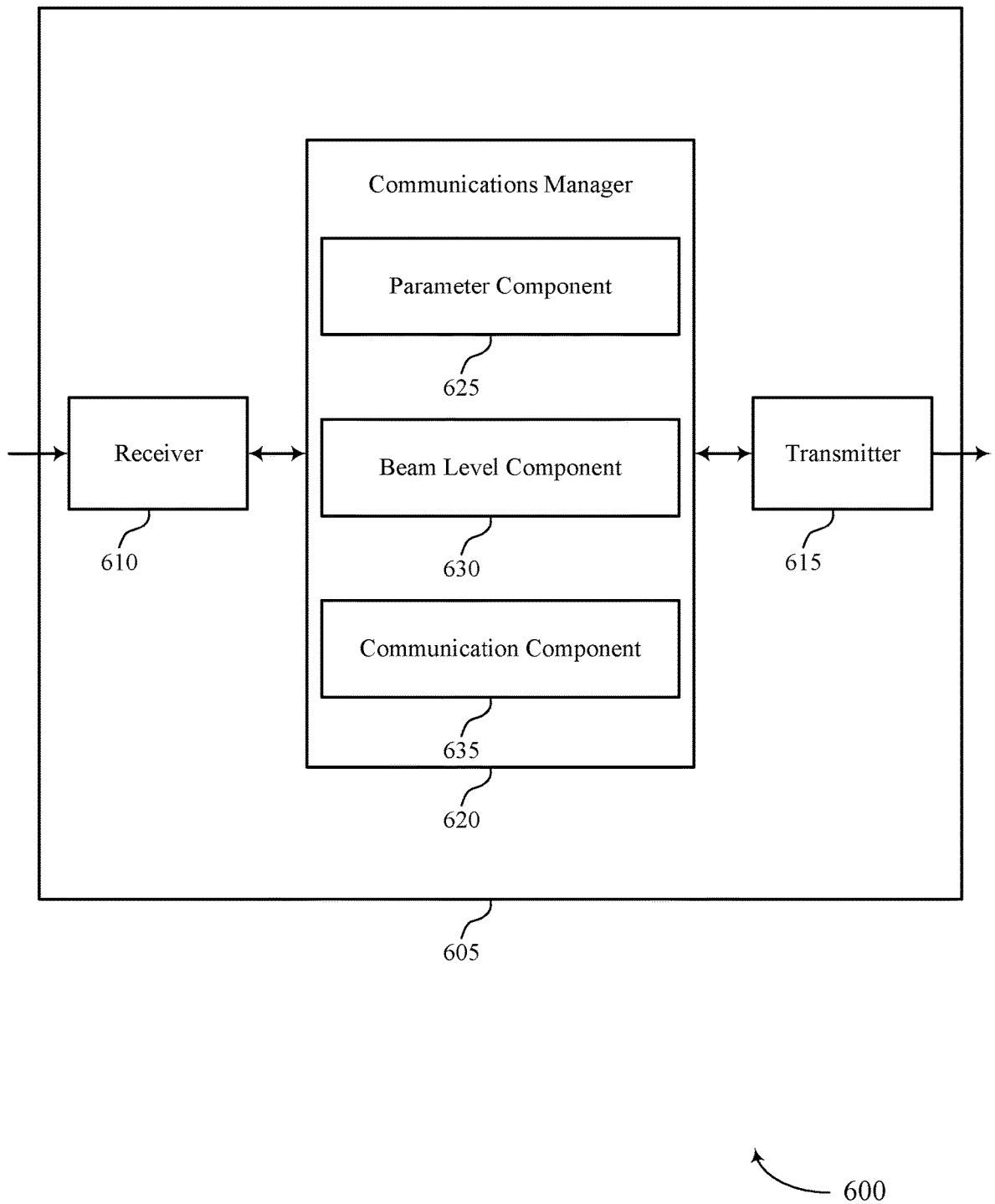

FIG. 6 shows a block diagram 600 of a device 605 that supports techniques for adaptive beam level selection in accordance with various aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for adaptive beam level selection). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for adaptive beam level selection). In some examples, the transmitter 615 may be co-located with a receiver 610 in a transceiver component. The transmitter 615 may utilize a single antenna or a set of multiple antennas.

The device 605, or various components thereof, may be an example of means for performing various aspects of techniques for adaptive beam level selection as described herein. For example, the communications manager 620 may include a parameter component 625, a beam level component 630, a communication component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE (e.g., the device 605) in accordance with examples as disclosed herein. The parameter component 625 may be configured as or otherwise support a means for identifying a set of beam level selection parameters, the set of beam level selection parameters including traffic information, channel information, application information, or any combination thereof. The beam level component 630 may be configured as or otherwise support a means for selecting, based on the identified set of beam level selection parameters, a beam level, from a set of beam levels, different from a baseline beam level associated with the wireless communication, the selected beam level is associated with a number of antenna elements different from a number of antenna elements associated with the baseline beam level.

The communication component 635 may be configured as or otherwise support a means for performing the wireless communication based on the selected beam level.

Figure 7:
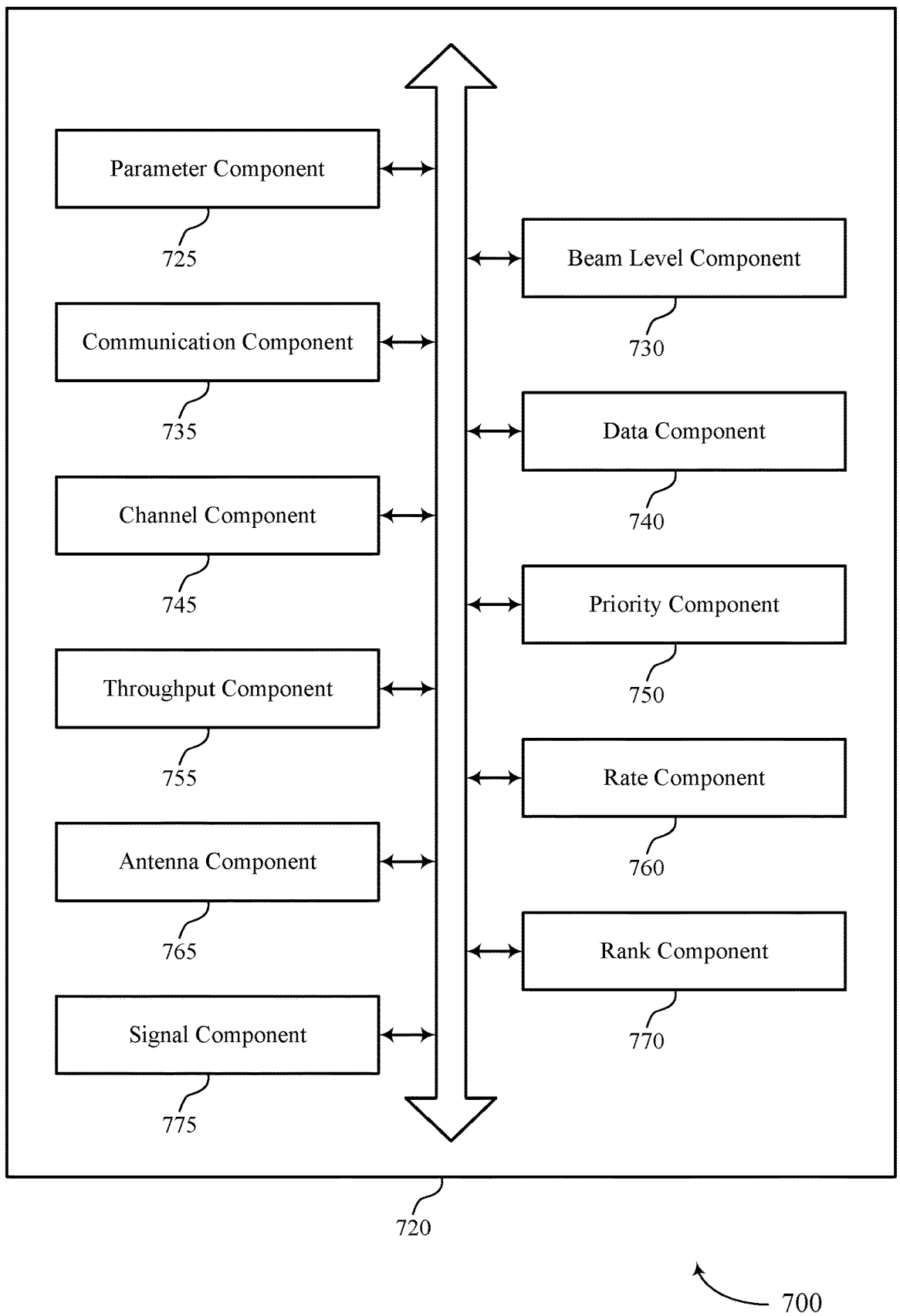
FIG. 7 shows a block diagram of a communications manager that supports techniques for adaptive beam level selection in accordance with various aspects of the present disclosure.

FIG. 7 shows a block diagram 700 of a communications manager 720 that supports techniques for adaptive beam level selection in accordance with various aspects of the present disclosure. The communications manager 720 may be an example of aspects of a communications manager 520, a communications manager 620, or both, as described herein. The communications manager 720, or various components thereof, may be an example of means for performing various aspects of techniques for adaptive beam level selection as described herein. For example, the communications manager 720 may include a parameter component 725, a beam level component 730, a communication component 735, a data component 740, a channel component 745, a priority component 750, a throughput component 755, a rate component 760, an antenna component 765, a rank component 770, a signal component 775, or any combination thereof. Each of these components may communicate, directly or indirectly, with one another (e.g., via one or more buses).

The communications manager 720 may support wireless communication at a UE in accordance with examples as disclosed herein. The parameter component 725 may be configured as or otherwise support a means for identifying a set of beam level selection parameters, the set of beam level selection parameters including traffic information, channel information, application information, or any combination thereof. The beam level component 730 may be configured as or otherwise support a means for selecting, based on the identified set of beam level selection parameters, a beam level, from a set of beam levels, different from a baseline beam level associated with the wireless communication, the selected beam level is associated with a number of antenna elements different from a number of antenna elements associated with the baseline beam level. The communication component 735 may be configured as or otherwise support a means for performing the wireless communication based on the selected beam level.

In some examples, the parameter component 725 may be configured as or otherwise support a means for determining a respective threshold for one or more beam level selection parameters of the identified set of beam level selection parameters. In some examples, the beam level component 730 may be configured as or otherwise support a means for selecting the beam level of the set of beam levels associated with the wireless communication based on the determined respective threshold for the one or more beam level selection parameters of the identified set of beam level selection parameters. In some examples, the selected beam level of the set of beam levels corresponds to a first number of antenna elements of the UE based on the respective threshold for the one or more beam level selection parameters of the identified set of beam level selection parameters being greater than a threshold. In some examples, the selected beam level of the set of beam levels corresponds to a second number of antenna elements of the UE based on the respective threshold for the one or more beam level selection parameters of the identified set of beam level selection parameters being less than the threshold, the first number of antenna elements being greater than the second number of antenna elements.

In some examples, the antenna component 765 may be configured as or otherwise support a means for performing the wireless communication using an increased number of antenna elements of the UE relative to a baseline number of antenna elements at the UE based on the respective threshold for the one or more beam level selection parameters of the identified set of beam level selection parameters being greater than a threshold. In some examples, the antenna component 765 may be configured as or otherwise support a means for performing the wireless communication using a decreased number of antenna elements of the UE relative to a baseline number of antenna elements at the UE based on the respective threshold for the one or more beam level selection parameters of the identified set of beam level selection parameters being less than a threshold.

In some examples, the respective threshold for the one or more beam level selection parameters of the identified set of beam level selection parameters is based on a step size associated with the selected beam level of the set of beam levels. In some examples, the parameter component 725 may be configured as or otherwise support a means for determining the set of beam level selection parameters during a temporal window based on a configuration. In some examples, the data component 740 may be configured as or otherwise support a means for determining uplink data in a memory buffer associated with the UE based on the traffic information. In some examples, the beam level component 730 may be configured as or otherwise support a means for selecting the beam level of the set of beam levels associated with the wireless communication based on the determined uplink data in the memory buffer associated with the UE.

In some examples, the selected beam level of the set of beam levels corresponds to a first number of antenna elements of the UE based on the determined uplink data in the memory buffer associated with the UE being greater than a threshold. In some examples, the selected beam level of the set of beam levels corresponds to a second number of antenna elements of the UE based on the determined uplink data in the memory buffer associated with the UE being less than the threshold, the first number of antenna elements being greater than the second number of antenna elements. In some examples, the channel component 745 may be configured as or otherwise support a means for determining a channel metric associated with the UE based on the channel information, the channel metric corresponding to an uplink channel or a downlink channel, or both. In some examples, the beam level component 730 may be configured as or otherwise support a means for selecting the beam level of the set of beam levels associated with the wireless communication based on the determined channel metric associated with the UE.

In some examples, the determined channel metric includes virtual power headroom information, signal-to-noise-ratio information, spectral efficiency information, throughput, or any combination thereof. In some examples, the selected beam level of the set of beam levels corresponds to a first number of antenna elements of the UE based on the channel metric associated with the UE being greater than a threshold. In some examples, the selected beam level of the set of beam levels corresponds to a second number of antenna elements of the UE based on the channel metric associated with the UE being less than the threshold, the first number of antenna elements being greater than the second number of antenna elements.

In some examples, the channel component 745 may be configured as or otherwise support a means for determining a set of uplink channel metrics associated with the UE based on the channel information, the determined set of uplink channel metrics including VPHR information, SNR information, SPEFF information, throughput, or any combination thereof. In some examples, the priority component 750 may be configured as or otherwise support a means for determining a respective priority of each uplink channel metric of the determined set of uplink channel metrics. In some examples, the beam level component 730 may be configured as or otherwise support a means for selecting the beam level of the set of beam levels associated with the wireless communication based on the determined respective priority of each uplink channel metric of the determined set of uplink channel metrics. In some examples, the rank component 770 may be configured as or otherwise support a means for ranking each uplink channel metric of the determined set of uplink channel metrics in accordance with the respective priority of each uplink channel metric of the determined set of uplink channel metrics and based on each uplink channel metric of the determined set of uplink channel metrics being less than or greater than a respective threshold.

In some examples, the throughput component 755 may be configured as or otherwise support a means for determining a throughput for an application associated with the UE based on the application information. In some examples, the beam level component 730 may be configured as or otherwise support a means for selecting the beam level of the set of beam levels associated with the wireless communication based on the determined throughput for the application associated with the UE. In some examples, the selected beam level of the set of beam levels corresponds to a first number of antenna elements of the UE based on the determined throughput for the application associated with the UE being greater than a threshold. In some examples, the selected beam level of the set of beam levels corresponds to a second number of antenna elements of the UE based on the determined throughput for the application associated with the UE being less than the threshold, the first number of antenna elements being less than the second number of antenna elements. In some examples, the determined throughput for the application associated with the UE corresponds to an estimated throughput for the application associated with the UE.

In some examples, the rate component 760 may be configured as or otherwise support a means for determining a bin rate for an application associated with the UE based on the application information. In some examples, the beam level component 730 may be configured as or otherwise support a means for selecting the beam level of the set of beam levels associated with the wireless communication based on the determined bin rate for the application associated with the UE. In some examples, the selected beam level of the set of beam levels corresponds to a first number of antenna elements of the UE based on the determined bin rate for the application associated with the UE being greater than a threshold. In some examples, the selected beam level of the set of beam levels corresponds to a second number of antenna elements of the UE based on the determined bin rate for the application associated with the UE being less than the threshold, the first number of antenna elements being greater than the second number of antenna elements.

In some examples, the beam level component 730 may be configured as or otherwise support a means for determining the baseline beam level associated with the wireless communication based on a beam sweep operation associated with a set of reference signals and a set of quality metrics associated with the set of reference signals. In some examples, the beam level component 730 may be configured as or otherwise support a means for selecting the beam level of the set of beam levels associated with the wireless communication based on the determined baseline beam level. In some examples, the baseline beam level is different than the selected beam level.

In some examples, the signal component 775 may be configured as or otherwise support a means for receiving the set of reference signals based on the beam sweep operation. In some examples, the beam level component 730 may be configured as or otherwise support a means for determining one or more quality metrics of the set of quality metrics for each beam level of the set of beam levels based on the received set of reference signals. In some examples, the beam level component 730 may be configured as or otherwise support a means for determining the baseline beam level from the set of beam levels associated with the wireless communication based on the determined one or more quality metrics for each beam level of the set of beam levels. In some examples, the set of reference signals includes SSBs, CSI-RS, DMRS, or any combination thereof. In some examples, the set of quality metrics includes an RSRP, an SNR, an SPEFF, a throughput, or any combination thereof.

Figure 8:
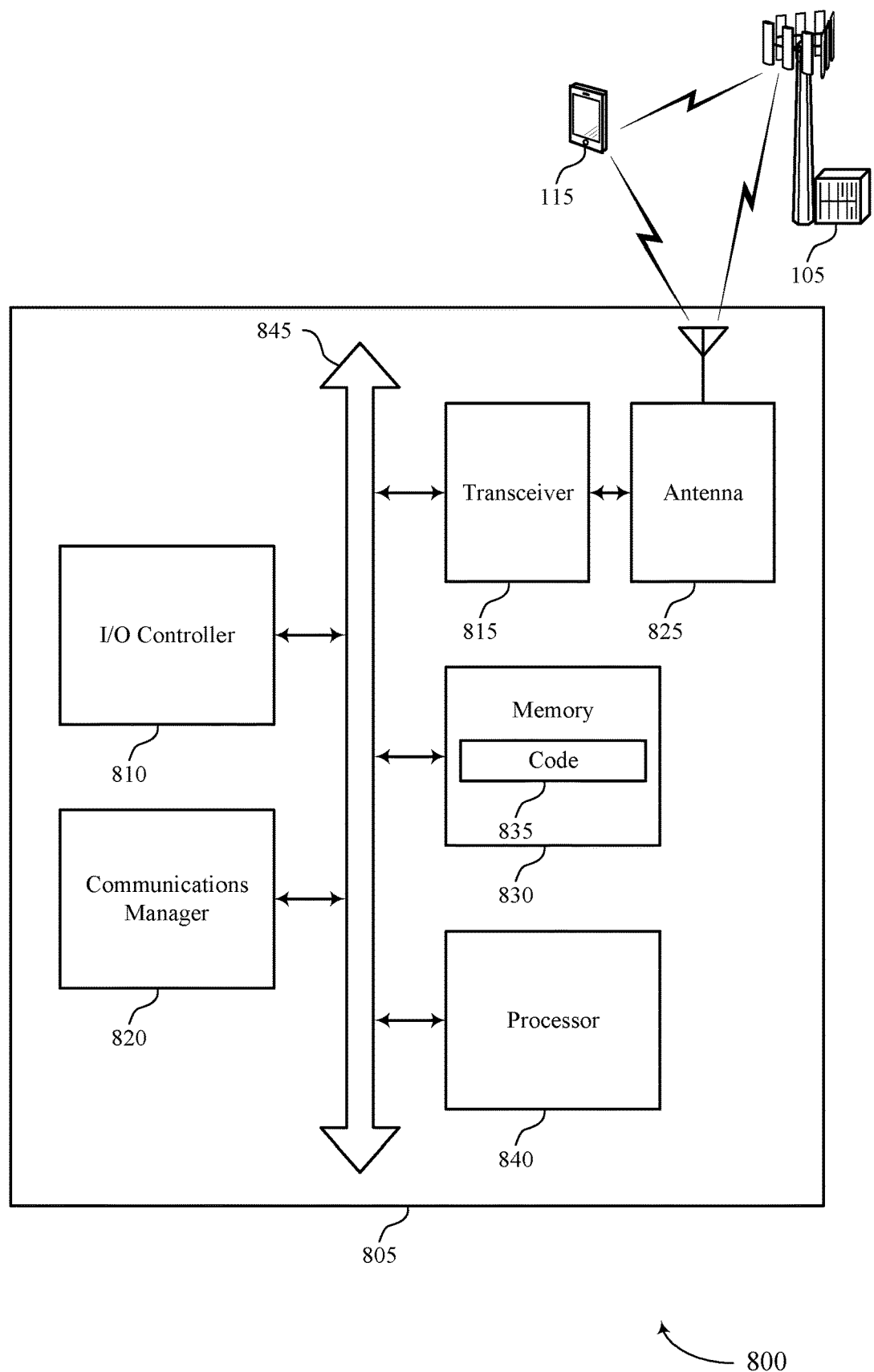
FIG. 8 shows a diagram of a system including a device that supports techniques for adaptive beam level selection in accordance with various aspects of the present disclosure.

FIG. 8 shows a diagram of a system 800 including a device 805 that supports techniques for adaptive beam level selection in accordance with various aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include an antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for adaptive beam level selection). For example, the device 805 or a component of the device 805 may include a processor 840 and memory 830 coupled with or to the processor 840, the processor 840 and memory 830 configured to perform various functions described herein.

The communications manager 820 may support wireless communication at a UE (e.g., the device 805) in accordance with examples as disclosed herein. For example, the communications manager 820 may be configured as or otherwise support a means for identifying a set of beam level selection parameters, the set of beam level selection parameters including traffic information, channel information, application information, or any combination thereof. The communications manager 820 may be configured as or otherwise support a means for selecting, based on the identified set of beam level selection parameters, a beam level, from a set of beam levels, different from a baseline beam level associated with the wireless communication, the selected beam level is associated with a number of antenna elements different from a number of antenna elements associated with the baseline beam level. The communications manager 820 may be configured as or otherwise support a means for performing the wireless communication based on the selected beam level.

By including or configuring the communications manager 820 in accordance with examples as described herein, the device 805 may support techniques for reduced power consumption, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for adaptive beam level selection as described herein, or the processor 840 and the memory 830 may be otherwise configured to perform or support such operations.

Figure 9:
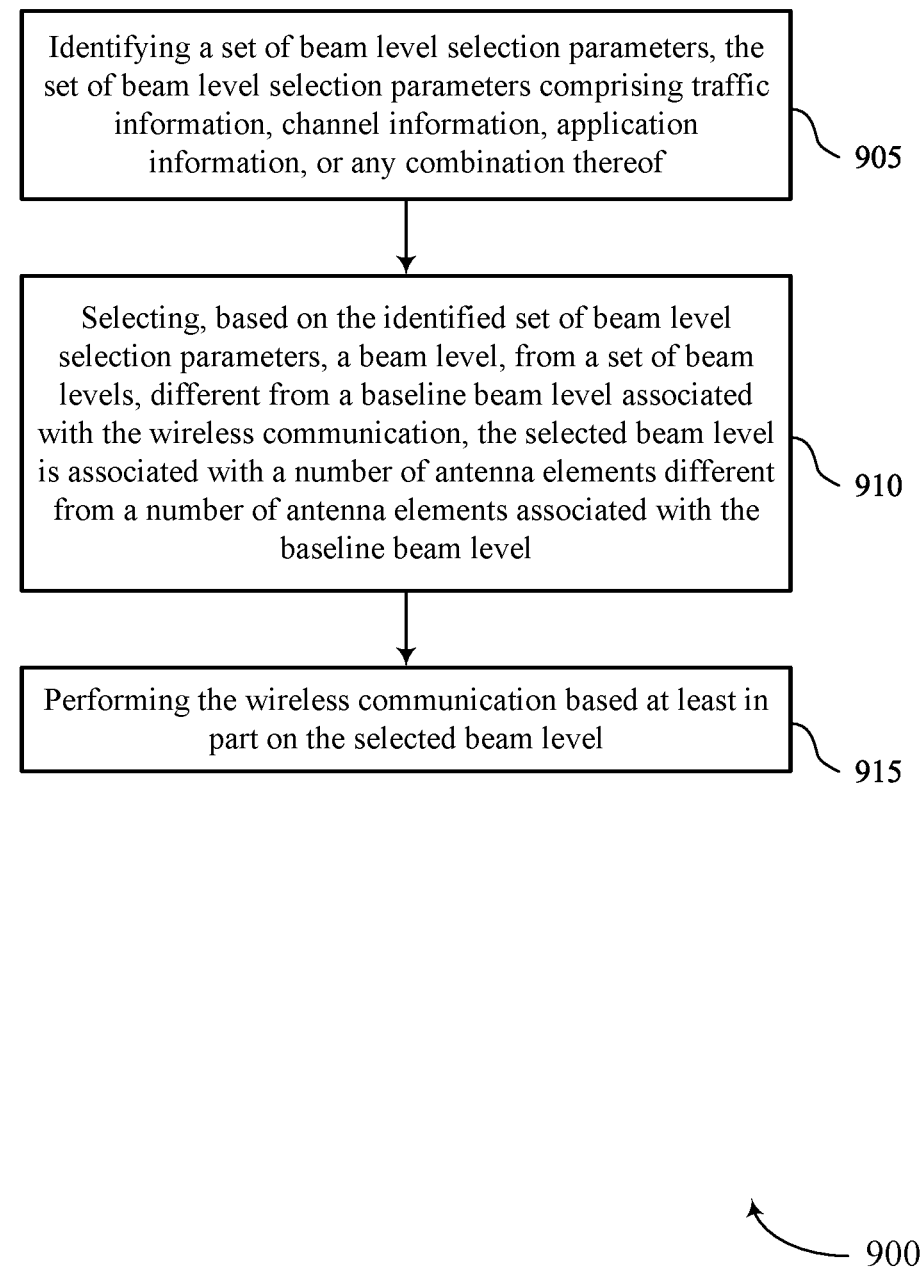
FIGS. 9 through 12 show flowcharts illustrating methods that support techniques for adaptive beam level selection in accordance with various aspects of the present disclosure.

FIG. 9 shows a flowchart illustrating a method 900 that supports techniques for adaptive beam level selection in accordance with various aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include identifying a set of beam level selection parameters, the set of beam level selection parameters including traffic information, channel information, application information, or any combination thereof. The operations of 905 may be performed in accordance with examples as disclosed herein. In some examples, aspects of the operations of 905 may be performed by a parameter component 725 as described with reference to FIG. 7.

At 910, the method may include selecting, based on the identified set of beam level selection parameters, a beam level, from a set of beam levels, different from a baseline beam level associated with the wireless communication, the selected beam level is associated with a number of antenna elements different from a number of antenna elements associated with the baseline beam level. The operations of 910 may be performed in accordance with examples as disclosed herein. In some examples, aspects of the operations of 910 may be performed by a beam level component 730 as described with reference to FIG. 7.

At 915, the method may include performing the wireless communication based on the selected beam level. The operations of 915 may be performed in accordance with examples as disclosed herein. In some examples, aspects of the operations of 915 may be performed by a communication component 735 as described with reference to FIG. 7.

Figure 10:
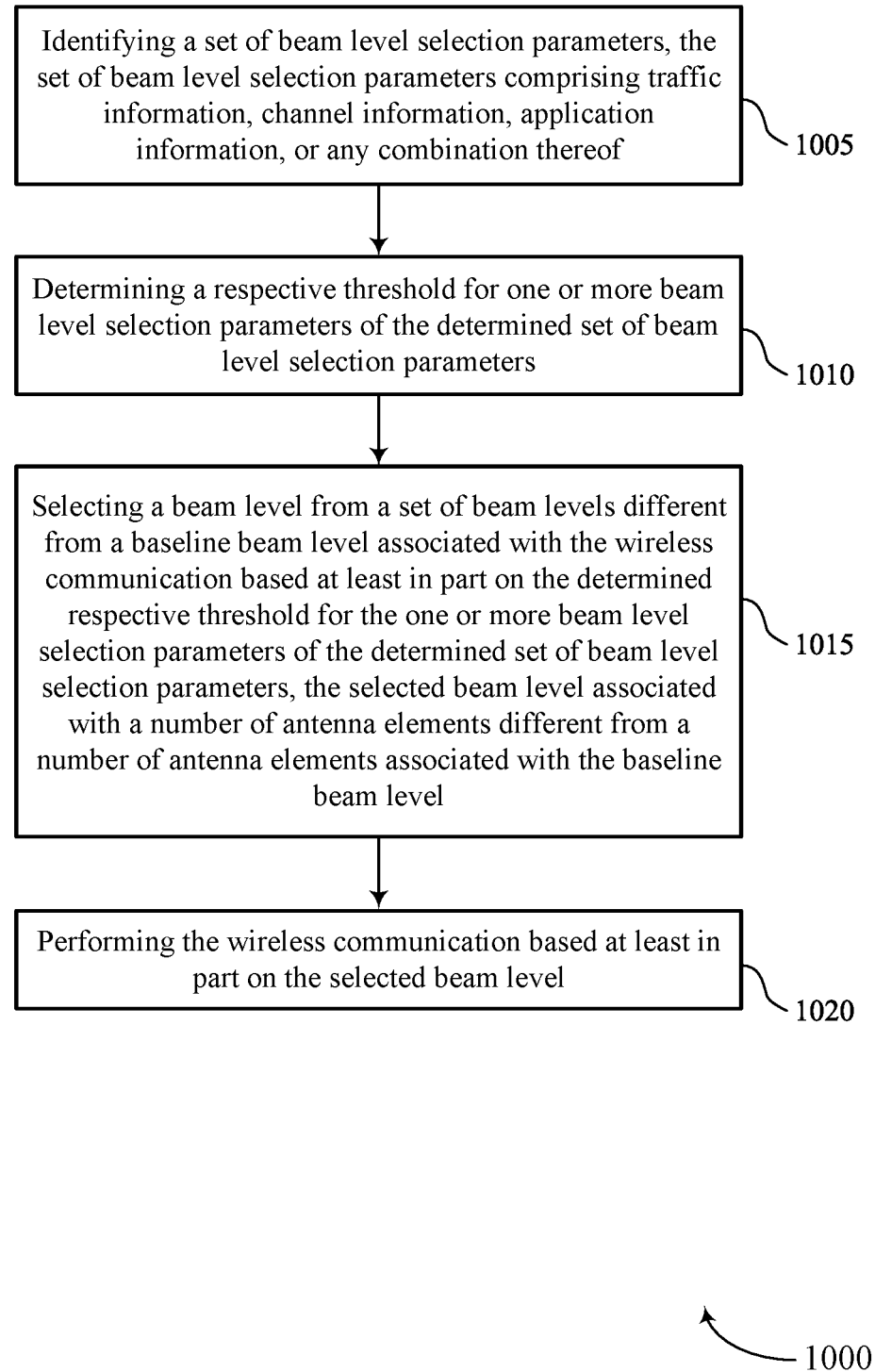

FIG. 10 shows a flowchart illustrating a method 1000 that supports techniques for adaptive beam level selection in accordance with various aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include identifying a set of beam level selection parameters, the set of beam level selection parameters including traffic information, channel information, application information, or any combination thereof. The operations of 1005 may be performed in accordance with examples as disclosed herein. In some examples, aspects of the operations of 1005 may be performed by a parameter component 725 as described with reference to FIG. 7.

At 1010, the method may include determining a respective threshold for one or more beam level selection parameters of the identified set of beam level selection parameters. The operations of 1010 may be performed in accordance with examples as disclosed herein. In some examples, aspects of the operations of 1010 may be performed by a parameter component 725 as described with reference to FIG. 7.

At 1015, the method may include selecting a beam level from a set of beam levels different from a baseline beam level associated with the wireless communication based at least in part on the determined respective threshold for the one or more beam level selection parameters of the identified set of beam level selection parameters, the selected beam level associated with a number of antenna elements different from a number of antenna elements associated with the baseline beam level. The operations of 1015 may be performed in accordance with examples as disclosed herein. In some examples, aspects of the operations of 1015 may be performed by a beam level component 730 as described with reference to FIG. 7.

At 1020, the method may include performing the wireless communication based on the selected beam level. The operations of 1020 may be performed in accordance with examples as disclosed herein. In some examples, aspects of the operations of 1020 may be performed by a communication component 735 as described with reference to FIG. 7.

Figure 11:
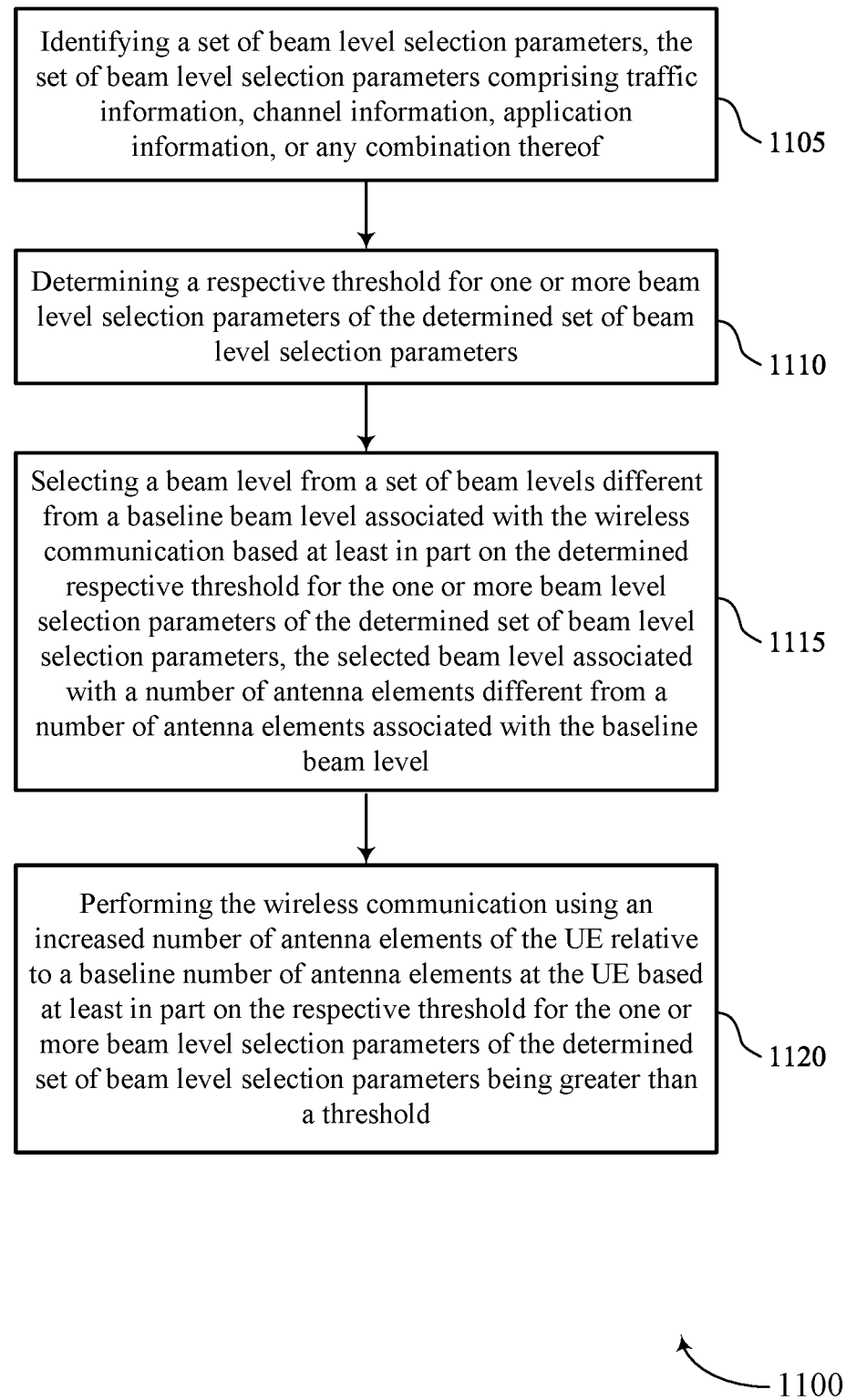

FIG. 11 shows a flowchart illustrating a method 1100 that supports techniques for adaptive beam level selection in accordance with various aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include identifying a set of beam level selection parameters, the set of beam level selection parameters including traffic information, channel information, application information, or any combination thereof. The operations of 1105 may be performed in accordance with examples as disclosed herein. In some examples, aspects of the operations of 1105 may be performed by a parameter component 725 as described with reference to FIG. 7.

At 1110, the method may include determining a respective threshold for one or more beam level selection parameters of the identified set of beam level selection parameters. The operations of 1110 may be performed in accordance with examples as disclosed herein. In some examples, aspects of the operations of 1110 may be performed by a parameter component 725 as described with reference to FIG. 7.

At 1115, the method may include selecting a beam level from a set of beam levels different from a baseline beam level associated with the wireless communication based at least in part on the determined respective threshold for the one or more beam level selection parameters of the identified set of beam level selection parameters, the selected beam level associated with a number of antenna elements different from a number of antenna elements associated with the baseline beam level. The operations of 1115 may be performed in accordance with examples as disclosed herein. In some examples, aspects of the operations of 1115 may be performed by a beam level component 730 as described with reference to FIG. 7.

At 1120, the method may include performing the wireless communication using an increased number of antenna elements of the UE relative to a baseline number of antenna elements at the UE based at least in part on the respective threshold for the one or more beam level selection parameters of the identified set of beam level selection parameters being greater than a threshold. The operations of 1120 may be performed in accordance with examples as disclosed herein. In some examples, aspects of the operations of 1120 may be performed by a communication component 735 as described with reference to FIG. 7.

Figure 12:
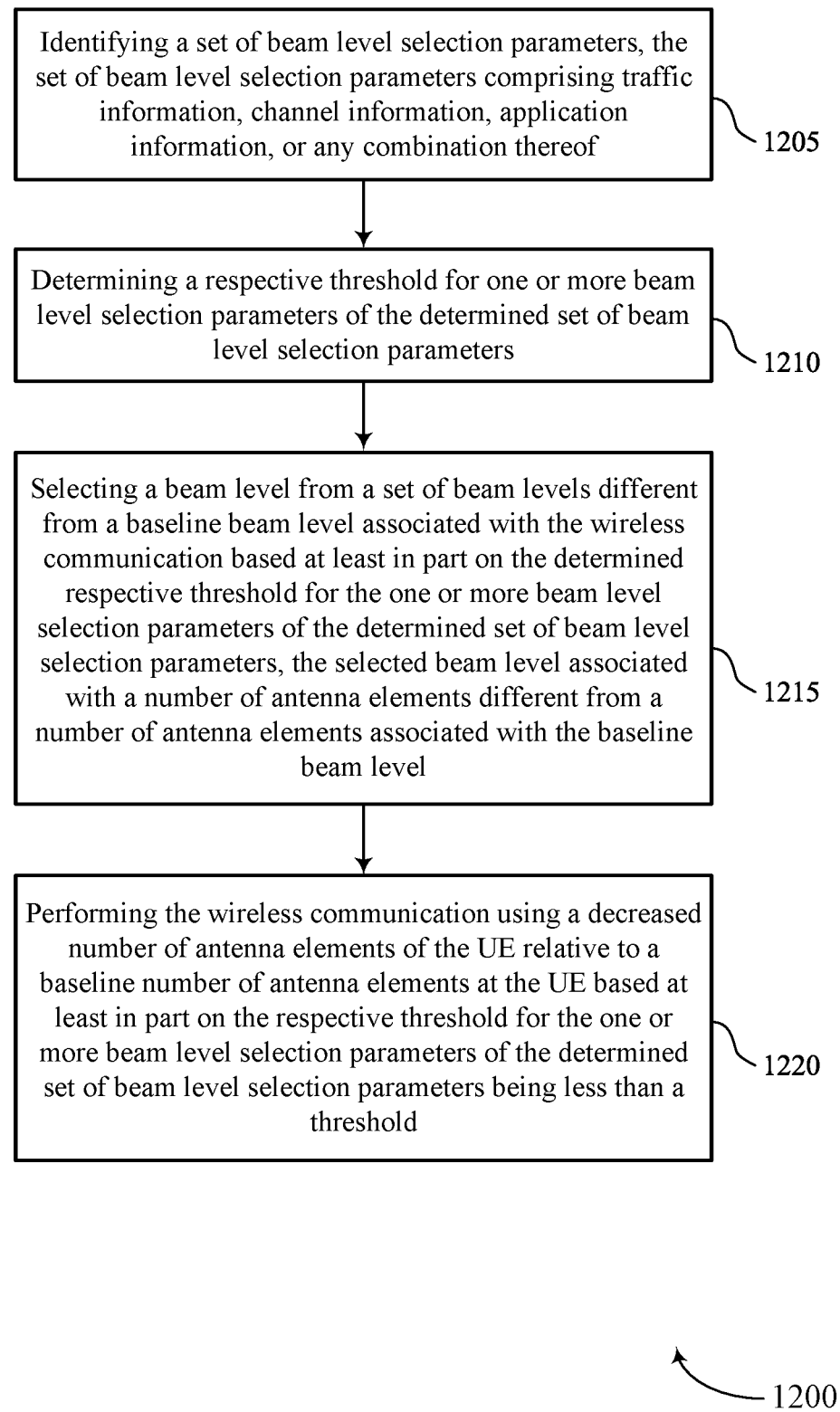

FIG. 12 shows a flowchart illustrating a method 1200 that supports techniques for adaptive beam level selection in accordance with various aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include identifying a set of beam level selection parameters, the set of beam level selection parameters including traffic information, channel information, application information, or any combination thereof. The operations of 1205 may be performed in accordance with examples as disclosed herein. In some examples, aspects of the operations of 1205 may be performed by a parameter component 725 as described with reference to FIG. 7.

At 1210, the method may include determining a respective threshold for one or more beam level selection parameters of the identified set of beam level selection parameters. The operations of 1210 may be performed in accordance with examples as disclosed herein. In some examples, aspects of the operations of 1210 may be performed by a parameter component 725 as described with reference to FIG. 7.

At 1215, the method may include selecting a beam level from a set of beam levels different from a baseline beam level associated with the wireless communication based at least in part on the determined respective threshold for the one or more beam level selection parameters of the identified set of beam level selection parameters, the selected beam level associated with a number of antenna elements different from a number of antenna elements associated with the baseline beam level. The operations of 1215 may be performed in accordance with examples as disclosed herein. In some examples, aspects of the operations of 1215 may be performed by a beam level component 730 as described with reference to FIG. 7.

At 1220, the method may include performing the wireless communication using a decreased number of antenna elements of the UE relative to a baseline number of antenna elements at the UE based at least in part on the respective threshold for the one or more beam level selection parameters of the identified set of beam level selection parameters being less than a threshold. The operations of 1220 may be performed in accordance with examples as disclosed herein. In some examples, aspects of the operations of 1220 may be performed by a communication component 735 as described with reference to FIG. 7.

The following provides an overview of aspects of the present disclosure:

Aspect 1: A method for wireless communication at a UE, comprising: determining a set of beam level selection parameters, the set of beam level selection parameters comprising traffic information, channel information, application information, or any combination thereof; selecting a beam level of a set of beam levels associated with the wireless communication based at least in part on the determined set of beam level selection parameters, the selected beam level being associated with a number of antenna elements of the UE; and performing the wireless communication based at least in part on the selected beam level.

Aspect 2: The method of aspect 1, further comprising: determining a respective threshold for one or more beam level selection parameter of the determined set of beam level selection parameters, wherein selecting the beam level of the set of beam levels associated with the wireless communication is further based at least in part on the determined respective threshold for the one or more beam level selection parameter of the determined set of beam level selection parameters.

Aspect 3: The method of aspect 2, wherein the selected beam level of the set of beam levels corresponds to a first number of antenna elements of the UE based at least in part on the respective threshold for the one or more beam level selection parameter of the determined set of beam level selection parameters being greater than a threshold, and the selected beam level of the set of beam levels corresponds to a second number of antenna elements of the UE based at least in part on the respective threshold for the one or more beam level selection parameter of the determined set of beam level selection parameters being less than the threshold, the first number of antenna elements being greater than the second number of antenna elements.

Aspect 4: The method of any of aspects 2 through 3, further comprising: performing the wireless communication using an increased number of antenna elements of the UE relative to a baseline number of antenna elements at the UE based at least in part on the respective threshold for the one or more beam level selection parameter of the determined set of beam level selection parameters being greater than a threshold.

Aspect 5: The method of any of aspects 2 through 3, further comprising: performing the wireless communication using a decreased number of antenna elements of the UE relative to a baseline number of antenna elements at the UE based at least in part on the respective threshold for the one or more beam level selection parameter of the determined set of beam level selection parameters being less than a threshold.

Aspect 6: The method of any of aspects 2 through 5, wherein the respective threshold for the one or more beam level selection parameters of the determined set of beam level selection parameters is based at least in part on a step size associated with the selected beam level of the set of beam levels.

Aspect 7: The method of any of aspects 2 through 6, further comprising: determining the set of beam level selection parameters during a temporal window based at least in part on a configuration.

Aspect 8: The method of any of aspects 1 through 7, further comprising: determining uplink data in a memory buffer associated with the UE based at least in part on the traffic information, wherein selecting the beam level of the set of beam levels associated with the wireless communication is further based at least in part on the determined uplink data in the memory buffer associated with the UE.

Aspect 9: The method of aspect 8, wherein the selected beam level of the set of beam levels corresponds to a first number of antenna elements of the UE based at least in part on the determined uplink data in the memory buffer associated with the UE being greater than a threshold, and the selected beam level of the set of beam levels corresponds to a second number of antenna elements of the UE based at least in part on the determined uplink data in the memory buffer associated with the UE being less than the threshold, the first number of antenna elements being greater than the second number of antenna elements.

Aspect 10: The method of any of aspects 1 through 9, further comprising: determining a channel metric associated with the UE based at least in part on the channel information, the channel metric corresponding to an uplink channel or a downlink channel, or both, wherein selecting the beam level of the set of beam levels associated with the wireless communication is further based at least in part on the determined channel metric associated with the UE.

Aspect 11: The method of aspect 10, wherein the determined channel metric comprises VPHR information, SNR information, SPEFF information, throughput, or any combination thereof.

Aspect 12: The method of any of aspects 10 through 11, wherein the selected beam level of the set of beam levels corresponds to a first number of antenna elements of the UE based at least in part on the channel metric associated with the UE being greater than a threshold, and the selected beam level of the set of beam levels corresponds to a second number of antenna elements of the UE based at least in part on the channel metric associated with the UE being less than the threshold, the first number of antenna elements being greater than the second number of antenna elements.

Aspect 13: The method of any of aspects 1 through 12, further comprising: determining a set of uplink channel metrics associated with the UE based at least in part on the channel information, the determined set of uplink channel metrics comprising VPHR information, SNR information, SPEFF information, throughput, or any combination thereof; determining a respective priority of each uplink channel metric of the determined set of uplink channel metrics, wherein selecting the beam level of the set of beam levels associated with the wireless communication is further based at least in part on the determined respective priority of each uplink channel metric of the determined set of uplink channel metrics.

Aspect 14: The method of aspect 13, further comprising: ranking each uplink channel metric of the determined set of uplink channel metrics in accordance with the respective priority of each uplink channel metric of the determined set of uplink channel metrics and based at least in part on each uplink channel metric of the determined set of uplink channel metrics being less than or greater than a respective threshold.

Aspect 15: The method of any of aspects 1 through 14, further comprising: determining a throughput for an application associated with the UE based at least in part on the application information, wherein selecting the beam level of the set of beam levels associated with the wireless communication is further based at least in part on the determined throughput for the application associated with the UE.

Aspect 16: The method of aspect 15, wherein the selected beam level of the set of beam levels corresponds to a first number of antenna elements of the UE based at least in part on the determined throughput for the application associated with the UE being greater than a threshold, and the selected beam level of the set of beam levels corresponds to a second number of antenna elements of the UE based at least in part on the determined throughput for the application associated with the UE being less than the threshold, the first number of antenna elements being less than the second number of antenna elements.

Aspect 17: The method of any of aspects 15 through 16, wherein the determined throughput for the application associated with the UE corresponds to an estimated throughput for the application associated with the UE.

Aspect 18: The method of any of aspects 1 through 17, further comprising: determining a bin rate for an application associated with the UE based at least in part on the application information, wherein selecting the beam level of the set of beam levels associated with the wireless communication is further based at least in part on the determined bin rate for the application associated with the UE.

Aspect 19: The method of aspect 18, wherein the selected beam level of the set of beam levels corresponds to a first number of antenna elements of the UE based at least in part on the determined bin rate for the application associated with the UE being greater than a threshold, and the selected beam level of the set of beam levels corresponds to a second number of antenna elements of the UE based at least in part on the determined bin rate for the application associated with the UE being less than the threshold, the first number of antenna elements being greater than the second number of antenna elements.

Aspect 20: The method of any of aspects 1 through 19, further comprising: determining an initial beam level from the set of beam levels associated with the wireless communication based at least in part on a beam sweep operation associated with a set of reference signals and a set of quality metrics associated with the set of reference signals, wherein selecting the beam level of the set of beam levels associated with the wireless communication is further based at least in part on the determined initial beam level.

Aspect 21: The method of aspect 20, wherein the initial beam level is different than the selected beam level.

Aspect 22: The method of any of aspects 20 through 21, further comprising: receiving the set of reference signals based at least in part on the beam sweep operation; determining one or more quality metrics of the set of quality metrics for each beam level of the set of beam levels based at least in part on the received set of reference signals, wherein determining the initial beam level from the set of beam levels associated with the wireless communication is further based at least in part on the determined one or more quality metrics for each beam level of the set of beam levels.

Aspect 23: The method of any of aspects 20 through 22, wherein the set of reference signals comprises SSBs, CSI-RSs, DMRSs, or any combination thereof.

Aspect 24: The method of any of aspects 20 through 23, wherein the set of quality metrics comprises an RSRP, an SNR, an SPEFF, a throughput, or any combination thereof.

Aspect 25: An apparatus for wireless communication at a UE, comprising a processor; memory coupled with the processor; and instructions stored in the memory and executable by the processor to cause the apparatus to perform a method of any of aspects 1 through 24.

Aspect 26: An apparatus for wireless communication at a UE, comprising at least one means for performing a method of any of aspects 1 through 24.

Aspect 27: A non-transitory computer-readable medium storing code for wireless communication at a UE, the code comprising instructions executable by a processor to perform a method of any of aspects 1 through 24.

It should be noted that the techniques described herein describe possible implementations, and that the operations and the steps may be rearranged or otherwise modified and that other implementations are possible. Further, aspects from two or more of the techniques may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    identifying a set of beam level selection parameters, the set of beam level selection parameters comprising uplink traffic information, uplink channel information, application information, or any combination thereof;
    selecting, based at least in part on the identified set of beam level selection parameters, a beam level, from a set of beam levels, different from a baseline beam level associated with the wireless communication, the selected beam level is associated with a number of antenna elements different from a number of antenna elements associated with the baseline beam level; and
    transmitting an uplink signal associated with the wireless communication based at least in part on the selected beam level and the associated number of antenna elements.

2. The method of claim 1, further comprising:
    determining a respective threshold for one or more beam level selection parameters of the identified set of beam level selection parameters,
    wherein selecting the beam level of the set of beam levels associated with the wireless communication is further based at least in part on the determined respective threshold for the one or more beam level selection parameters of the identified set of beam level selection parameters.

3. The method of claim 2, wherein:
    the selected beam level of the set of beam levels corresponds to a first number of antenna elements of the UE based at least in part on the respective threshold for the one or more beam level selection parameters of the identified set of beam level selection parameters being greater than a threshold, and
    the selected beam level of the set of beam levels corresponds to a second number of antenna elements of the UE based at least in part on the respective threshold for the one or more beam level selection parameters of the identified set of beam level selection parameters being less than the threshold, the first number of antenna elements being greater than the second number of antenna elements.

4. The method of claim 2, further comprising:
    transmitting the uplink signal associated with the wireless communication using an increased number of antenna elements of the UE relative to a baseline number of antenna elements at the UE based at least in part on the respective threshold for the one or more beam level selection parameters of the identified set of beam level selection parameters being greater than a threshold.

5. The method of claim 2, further comprising:
    transmitting the uplink signal associated with the wireless communication using a decreased number of antenna elements of the UE relative to a baseline number of antenna elements at the UE based at least in part on the respective threshold for the one or more beam level selection parameters of the identified set of beam level selection parameters being less than a threshold.

6. The method of claim 2, wherein the respective threshold for the one or more beam level selection parameters of the identified set of beam level selection parameters is based at least in part on a step size associated with the selected beam level of the set of beam levels.

7. The method of claim 2, further comprising:
determining the set of beam level selection parameters during a temporal window based at least in part on a configuration.

8. The method of claim 1, further comprising:
determining uplink data in a memory buffer associated with the UE based at least in part on the uplink traffic information,
wherein selecting the beam level of the set of beam levels associated with the wireless communication is further based at least in part on the determined uplink data in the memory buffer associated with the UE.

9. The method of claim 8, wherein:
the selected beam level of the set of beam levels corresponds to a first number of antenna elements of the UE based at least in part on the determined uplink data in the memory buffer associated with the UE being greater than a threshold, and
the selected beam level of the set of beam levels corresponds to a second number of antenna elements of the UE based at least in part on the determined uplink data in the memory buffer associated with the UE being less than the threshold, the first number of antenna elements being greater than the second number of antenna elements.

10. The method of claim 1, further comprising:
determining a channel metric associated with the UE based at least in part on the uplink channel information, the channel metric corresponding to an uplink channel or a downlink channel, or both,
wherein selecting the beam level of the set of beam levels associated with the wireless communication is further based at least in part on the determined channel metric associated with the UE.

11. The method of claim 10, wherein the determined channel metric comprises virtual power headroom information, signal-to-noise-ratio information, spectral efficiency information, throughput, or any combination thereof.

12. The method of claim 10, wherein:
the selected beam level of the set of beam levels corresponds to a first number of antenna elements of the UE based at least in part on the channel metric associated with the UE being greater than a threshold, and
the selected beam level of the set of beam levels corresponds to a second number of antenna elements of the UE based at least in part on the channel metric associated with the UE being less than the threshold, the first number of antenna elements being greater than the second number of antenna elements.

13. The method of claim 1, further comprising:
determining a set of uplink channel metrics associated with the UE based at least in part on the uplink channel information, the determined set of uplink channel metrics comprising virtual power headroom information, signal-to-noise-ratio information, spectral efficiency information, throughput, or any combination thereof; and
determining a respective priority of each uplink channel metric of the determined set of uplink channel metrics, wherein selecting the beam level of the set of beam levels associated with the wireless communication is further based at least in part on the determined respective priority of each uplink channel metric of the determined set of uplink channel metrics.

14. The method of claim 13, further comprising:
ranking each uplink channel metric of the determined set of uplink channel metrics in accordance with the respective priority of each uplink channel metric of the determined set of uplink channel metrics and based at least in part on each uplink channel metric of the determined set of uplink channel metrics being less than or greater than a respective threshold.

15. The method of claim 1, further comprising:
determining a throughput for an application associated with the UE based at least in part on the application information,
wherein selecting the beam level of the set of beam levels associated with the wireless communication is further based at least in part on the determined throughput for the application associated with the UE.

16. The method of claim 15, wherein:
the selected beam level of the set of beam levels corresponds to a first number of antenna elements of the UE based at least in part on the determined throughput for the application associated with the UE being greater than a threshold, and
the selected beam level of the set of beam levels corresponds to a second number of antenna elements of the UE based at least in part on the determined throughput for the application associated with the UE being less than the threshold, the first number of antenna elements being less than the second number of antenna elements.

17. The method of claim 15, wherein the determined throughput for the application associated with the UE corresponds to an estimated throughput for the application associated with the UE.

18. The method of claim 1, further comprising:
determining a bin rate for an application associated with the UE based at least in part on the application information,
wherein selecting the beam level of the set of beam levels associated with the wireless communication is further based at least in part on the determined bin rate for the application associated with the UE.

19. The method of claim 18, wherein:
the selected beam level of the set of beam levels corresponds to a first number of antenna elements of the UE based at least in part on the determined bin rate for the application associated with the UE being greater than a threshold, and
the selected beam level of the set of beam levels corresponds to a second number of antenna elements of the UE based at least in part on the determined bin rate for the application associated with the UE being less than the threshold, the first number of antenna elements being greater than the second number of antenna elements.

20. The method of claim 1, further comprising:
determining the baseline beam level associated with the wireless communication based at least in part on a beam sweep operation associated with a set of reference signals and a set of quality metrics associated with the set of reference signals,
wherein selecting the beam level of the set of beam levels associated with the wireless communication is further based at least in part on the determined baseline beam level.

21. The method of claim 20, wherein the baseline beam level is different than the selected beam level.

22. The method of claim 20, further comprising:
receiving the set of reference signals based at least in part on the beam sweep operation; and
determining one or more quality metrics of the set of quality metrics for each beam level of the set of beam levels based at least in part on the received set of reference signals,
wherein determining the baseline beam level from the set of beam levels associated with the wireless communication is further based at least in part on the determined one or more quality metrics for each beam level of the set of beam levels.

23. The method of claim 20, wherein the set of reference signals comprises synchronization signal blocks, channel state information reference signals, demodulation reference signals, or any combination thereof.

24. The method of claim 20, wherein the set of quality metrics comprises a reference signal received power, a signal-to-noise ratio, a spectral efficiency, a throughput, or any combination thereof.

25. An apparatus for wireless communication at a user equipment (UE), comprising:
one or more processors;
one or more memories coupled with the one or more processors; and
instructions stored in the one or more memories and executable by the one or more processors to cause the apparatus to:
identify a set of beam level selection parameters, the set of beam level selection parameters comprising uplink traffic information, uplink channel information, application information, or any combination thereof;
select, based at least in part on the identified set of beam level selection parameters, a beam level, from a set of beam levels, different from a baseline beam level associated with the wireless communication, the selected beam level is associated with a number of antenna elements different from a number of antenna elements associated with the baseline beam level; and
transmit an uplink signal associated with the wireless communication based at least in part on the selected beam level and the associated number of antenna elements.

26. The apparatus of claim 25, wherein the instructions are further executable by the one or more processors to cause the apparatus to:
determine a respective threshold for one or more beam level selection parameters of the identified set of beam level selection parameters,
wherein the instruction to select the beam level of the set of beam levels associated with the wireless communication are further executable by the processor based at least in part on the determined respective threshold for the one or more beam level selection parameters of the identified set of beam level selection parameters.

27. The apparatus of claim 26, wherein:
the selected beam level of the set of beam levels corresponds to a first number of antenna elements of the UE based at least in part on the respective threshold for the one or more beam level selection parameters of the identified set of beam level selection parameters being greater than a threshold, and
the selected beam level of the set of beam levels corresponds to a second number of antenna elements of the UE based at least in part on the respective threshold for the one or more beam level selection parameters of the identified set of beam level selection parameters being less than the threshold, the first number of antenna elements being greater than the second number of antenna elements.

28. The apparatus of claim 26, wherein the instructions are further executable by the one or more processors to cause the apparatus to:
transmit the uplink signal associated with the wireless communication using an increased number of antenna elements of the UE relative to a baseline number of antenna elements at the UE based at least in part on the respective threshold for the one or more beam level selection parameters of the identified set of beam level selection parameters being greater than a threshold.

29. An apparatus for wireless communication at a user equipment (UE), comprising:
means for identifying a set of beam level selection parameters, the set of beam level selection parameters comprising uplink traffic information, uplink channel information, application information, or any combination thereof;
means for selecting, based at least in part on the identified set of beam level selection parameters, a beam level, from a set of beam levels, different from a baseline beam level associated with the wireless communication, the selected beam level is associated with a number of antenna elements different from a number of antenna elements associated with the baseline beam level; and
means for transmitting an uplink signal associated with the wireless communication based at least in part on the selected beam level and the associated number of antenna elements.

30. A non-transitory computer-readable medium storing code for wireless communication at a user equipment (UE), the code comprising instructions executable by one or more processors to:
identify a set of beam level selection parameters, the set of beam level selection parameters comprising uplink traffic information, uplink channel information, application information, or any combination thereof;
select, based at least in part on the identified set of beam level selection parameters, a beam level, from a set of beam levels, different from a baseline beam level associated with the wireless communication, the selected beam level is associated with a number of antenna elements different from a number of antenna elements associated with the baseline beam level; and
transmit an uplink signal associated with the wireless communication based at least in part on the selected beam level and the associated number of antenna elements.

* * * * *